(12) United States Patent
Kang et al.

(10) Patent No.: US 11,785,498 B2
(45) Date of Patent: *Oct. 10, 2023

(54) APPARATUS AND METHOD FOR SUPPORTING UNICAST TRANSMISSION BETWEEN USER EQUIPMENTS IN WIRELESS COMMUNICATION SYSTEM

(71) Applicant: Samsung Electronics Co., Ltd., Suwon-si (KR)

(72) Inventors: Hyunjeong Kang, Suwon-si (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,181

(22) Filed: Nov. 29, 2021

(65) Prior Publication Data

US 2022/0086685 A1  Mar. 17, 2022

Related U.S. Application Data

(63) Continuation of application No. 16/633,119, filed as application No. PCT/KR2019/013235 on Oct. 8, 2019, now Pat. No. 11,190,970.

(30) Foreign Application Priority Data

Oct. 8, 2018 (KR) .................. 10-2018-0120063
Jun. 21, 2019 (KR) .................. 10-2019-0074108

(51) Int. Cl.
*H04W 28/02* (2009.01)
*H04W 4/40* (2018.01)
(Continued)

(52) U.S. Cl.
CPC ......... *H04W 28/0268* (2013.01); *H04W 4/06* (2013.01); *H04W 4/40* (2018.02);
(Continued)

(58) Field of Classification Search
CPC . H04W 28/0268; H04W 80/02; H04W 76/27; H04W 4/40; H04W 4/06;
(Continued)

(56) References Cited

U.S. PATENT DOCUMENTS 10,827,380 B2 * 11/2020 Rao .................. H04W 28/0268
11,190,970 B2 * 11/2021 Kang ................ H04W 28/0268
(Continued)

FOREIGN PATENT DOCUMENTS

KR  10-2016-0018353 A  2/2016
KR  10-2017-0113445 A  10/2017
(Continued)

OTHER PUBLICATIONS

Koziol, Dawid, et al. "QoS and service continuity in 3GPP D2D for IoT and wearables." 2017 IEEE Conference on Standards for Communications and Networking (CSCN). IEEE, 2017. (Year: 2017).*

(Continued)

*Primary Examiner* — Sharad Rampuria

(57) ABSTRACT

The disclosure relates to a 5th generation (5G) or a pre-5G communication system provided to support a higher data transfer rate than a system after a 4th generation (4G) communication system such as long term evolution (LTE). An operation method of a terminal in a wireless communication system includes: obtaining an RLC transmission mode and RLC configuration information in the process of determining a V2X service requiring configuration of a unicast session and configuring the unicast session with another terminal; if the terminal is determined to be in the (Continued)

coverage of a base station, receiving an RLC transmission mode and RLC configuration information from the base station; and if it is determined that the terminal is not located in a base station coverage, obtaining a pre-configured unicast session and pre-configured RLC configuration information for each RLC transmission mode, which is mapped to a V2X service.

15 Claims, 23 Drawing Sheets

(51) Int. Cl.
*H04W 76/27* (2018.01)
*H04W 4/06* (2009.01)
*H04W 80/02* (2009.01)
*H04W 92/18* (2009.01)

(52) U.S. Cl.
CPC ........... *H04W 76/27* (2018.02); *H04W 80/02* (2013.01); *H04W 92/18* (2013.01)

(58) Field of Classification Search
CPC ..... H04W 92/18; H04W 76/40; H04W 76/14; H04W 28/02; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 2016/0044666 A1 | 2/2016 | Shin et al. | |
| 2016/0302215 A1 | 10/2016 | Sorrentino | |
| 2016/0345312 A1 | 11/2016 | Kim et al. | |
| 2017/0285177 A1 | 10/2017 | Jin et al. | |
| 2017/0367133 A1 | 12/2017 | Park et al. | |
| 2018/0049073 A1 | 2/2018 | Dinan et al. | |
| 2018/0132304 A1 | 5/2018 | Lee et al. | |
| 2018/0279275 A1 | 9/2018 | Chen et al. | |
| 2019/0239112 A1 | 8/2019 | Rao et al. | |
| 2020/0077460 A1* | 3/2020 | Hahn | H04W 76/14 |
| 2020/0092692 A1 | 3/2020 | Wang et al. | |
| 2020/0107236 A1* | 4/2020 | Tseng | H04W 76/27 |
| 2021/0168574 A1* | 6/2021 | Zhang | H04W 8/005 |
| 2021/0168647 A1* | 6/2021 | Li | H04W 28/0263 |

FOREIGN PATENT DOCUMENTS

| | | |
|---|---|---|
| KR | 10-2017-0142407 A | 12/2017 |
| WO | 2015122629 A1 | 8/2015 |
| WO | 2018171540 A1 | 9/2018 |

OTHER PUBLICATIONS

Xu, Chi, et al. "WIA-NR: ultra-reliable low-latency communication for industrial wireless control networks over unlicensed bands." IEEE Network 35.1 (2020): 258-265. (Year: 2020).*
Office Action dated Oct. 28, 2022 in connection with Indian Patent Application No. 202037051462, 6 pages.
International Search Report in connection with International Application No. PCT/KR2019/013235 dated Jan. 21, 2020, 3 pages.
Supplementary European Search Report dated Jul. 7, 2021, in connection with European Application No. 19870955.2, 7 pages.
ZTE, "QoS Considerations for the L2 Relay Architecture," R2-1700796, 3GPP TSG-RAN WG2 Meeting #97, Athens, Greece, Feb. 13-17, 2017, 3 pages.
Jacob, et al., "Hybrid V2X Communications: Multi-RAT as Enabler for Connected Autonomous Driving," 2018 IEEE 29th Annual International Symposium on Personal, Indoor and Mobile Radio Communications (PIMRC). IEEE, 2018, 7 pages.
Japan Patent Office (JPO), "Office Action," dated May 9, 2023, in connection with Japanese Patent Application No. 2020568560, 7 pages.
Samsung, "RLC Functions for NR Sidelink," 3GPP TSG RAN WG2 #103bis, Oct. 2018, Chengdu, China, R2-1815525, 2 pages.
Intel Corporation, "Considerations on unicast and group, cast support over NR SL," 3GPP TSG RAN WG2 #103bis, Oct. 2018, Chengdu, China, R2-1814065, 3 pages.
Huawei et al., "Support of unicast, groupcast and broadcast in NR sidelink," 3GPP TSG RAN WG2 #103bis, Oct. 2018, Chengdu, China, R2-1813932, 6 pages.
Sony, "Sidelink Enhancements," 3GPP TSG RAN WG2 #97bis, Apr. 2017, Spokane, USA, R2-1703275, 5 pages.

* cited by examiner

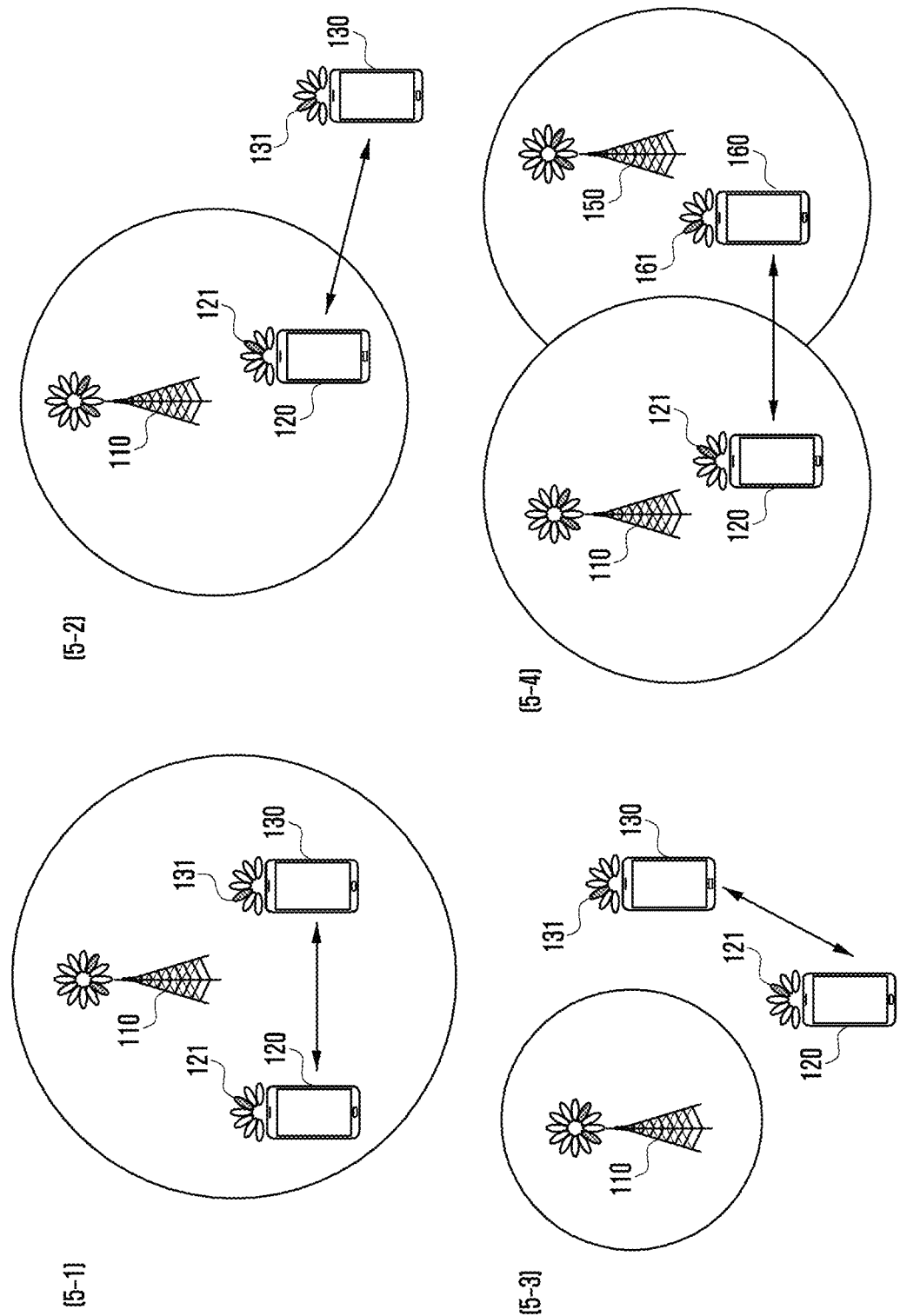

FIG. 6
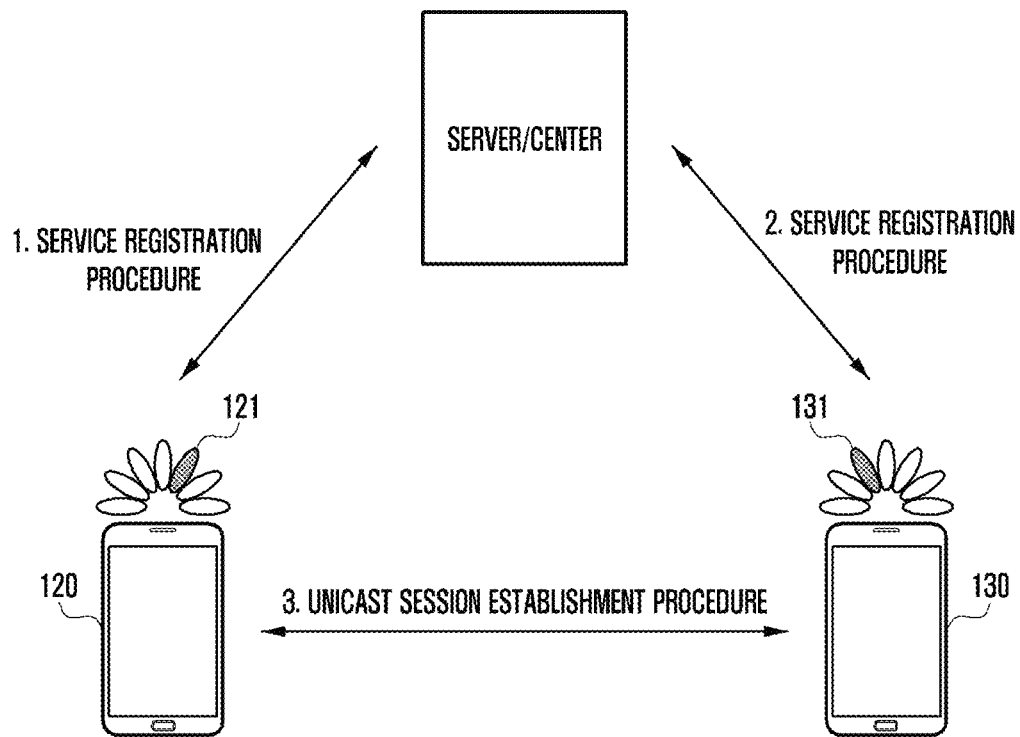
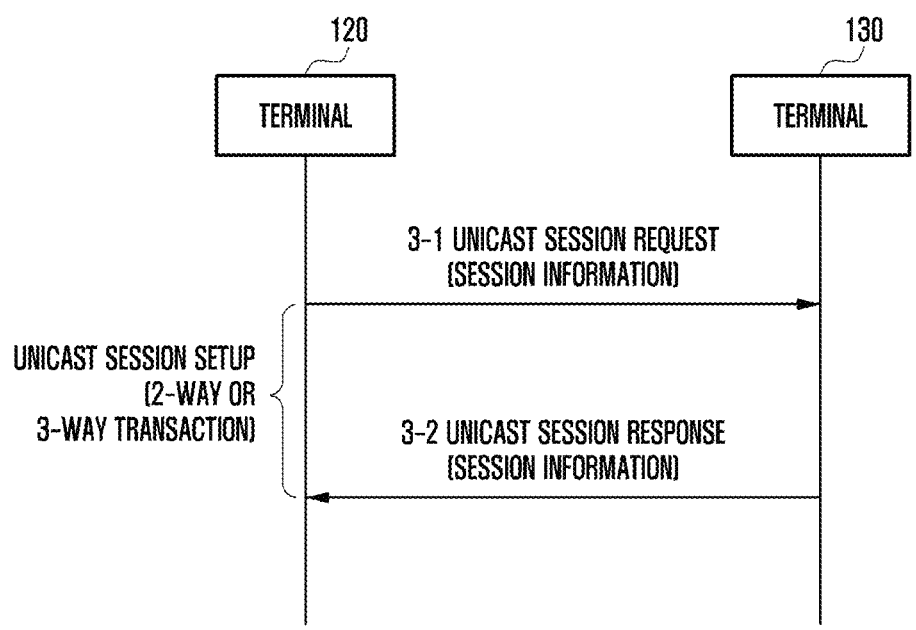

APPARATUS AND METHOD FOR SUPPORTING UNICAST TRANSMISSION BETWEEN USER EQUIPMENTS IN WIRELESS COMMUNICATION SYSTEM

CROSS-REFERENCE TO RELATED APPLICATIONS

This application is a continuation of application Ser. No. 16/633,119, now U.S. Pat. No. 11,190,970, which is a 371 National Stage of International Application No. PCT/KR2019/013235, filed Oct. 8, 2019, which claims priority to Korean Patent Application No. 10-2018-0120063, filed Oct. 8, 2018, and Korean Patent Application No. 10-2019-0074108, filed Jun. 21, 2019, the disclosures of which are herein incorporated by reference in their entirety.

BACKGROUND

1. Field

The disclosure relates generally to a wireless communication system and, more specifically, relates to an apparatus and method for supporting transmission or reception of a packet between terminals in a unicast scheme in a wireless communication system.

2. Description of Related Art

In order to meet wireless data traffic demands increasing after commercialization of 4G communication system, efforts to develop an improved 5G communication system or a pre-5G communication system have been made. For this reason, the 5G communication system or the pre-5G communication system is called a beyond 4G network communication system or a post-LTE system.

The 5G communication system is being considered to be implemented in a super-high frequency (mmWave) band (e.g., about 60 GHz band) to achieve a higher data transfer rate. To reduce the path loss of radio waves and increase the transfer distance of radio waves in a super-high frequency band, technologies including beamforming, massive multiple-input and multiple-output (MIMO), full dimensional MIMO (FD-MIMO), array antennas, analog beamforming, and large scale antennas have been discussed for the 5G communication system.

Further, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and received interference cancellation have been developed for the 5G communication system to improve the system network.

In addition, advanced coding modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) have been developed for the 5G system.

In the 5G system, various schemes for determining wireless resources have been discussed. For example, a direct communication scheme for a vehicle-to-everything (V2X) terminal has been proposed. Further, various discussions for shortening communication time, increasing reliability, and more efficiently supporting a direct communication between terminals are proceeding.

SUMMARY

On the basis of the discussions as described above, the disclosure provides an apparatus and method for supporting vehicle communication service and data transmission which accomplish high reliability and low-latency requirements, through a method of performing direct communication between terminals in a unicast scheme in a vehicle communication system.

According to various embodiments, an operation method of a terminal in a wireless communication system includes: transmitting, by the terminal, an RLC transmission mode configuration request to a base station to obtain an RLC transmission mode and RLC configuration information in the process of determining a V2X service requiring configuration of a sidelink unicast session and configuring the unicast session with another terminal; receiving the RLC transmission mode and RLC configuration information from the base station; and if it is determined that the terminal is not located in a base station coverage, obtaining pre-configured RLC configuration information for each RLC transmission mode, which is mapped to a V2X service profile for which the sidelink unicast session is configured.

According to various embodiments, a terminal apparatus in a wireless communication system includes a transceiver unit and at least one processor functionally coupled to the transceiver unit. The at least one processor is configured to: if the terminal apparatus is determined to be in the coverage of a base station, transmit sidelink unicast session information, and an RLC transmission mode and RLC configuration information request message to the base station; and receive an RLC transmission mode and RLC configuration information to be applied to a sidelink unicast session, from the base station, so as to control the terminal apparatus to perform sidelink unicast transmission or reception. The at least one processor is configured to: if it is determined that the terminal apparatus is not located in a base station coverage, obtain pre-configured RLC transmission mode and RLC configuration information, which is mapped to a V2X service profile of a sidelink unicast session, so as to control the terminal apparatus to perform sidelink unicast transmission or reception.

An apparatus and method according to various embodiments provides a method allowing transmission or reception of a packet in a unicast scheme between terminals in a vehicle communication system, thereby accomplishing reliability and low-latency requirements in vehicle communication.

Effects which can be acquired by the disclosure are not limited to the above described effects, and other effects that have not been mentioned may be clearly understood by those skilled in the art from the following description.

BRIEF DESCRIPTION OF THE DRAWINGS

FIG. 5 illustrates direct communication between terminals by a unicast scheme according to various embodiments;

FIG. 6 illustrates configuring a session for unicast transmission between terminals according to various embodiments;

DETAILED DESCRIPTION

The terms used in the disclosure are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal or similar to the contextual meanings in the relevant field of art, and are not to be interpreted to have ideal or excessively formal meanings unless clearly defined in the disclosure. In some cases, even the term defined in the disclosure should not be interpreted to exclude embodiments.

Hereinafter, various embodiments will be described from the perspective of hardware. However, various embodiments include a technology that uses both hardware and software and thus, the various embodiments may not exclude the perspective of software.

Hereinafter, the disclosure relates to an apparatus and method for determining wireless resources in a wireless communication system. Specifically, the disclosure includes a technology enabling satisfaction of a QoS level required for a V2X service by supporting unicast transmission or reception of data on the basis of a method for selecting an RLC transmission mode and obtaining RLC configuration information to perform direct communication between vehicle-to-everything (V2X) terminals through unicast sidelink in a wireless communication system.

In the following description, terms including a term indicating a signal, a term indicating a channel, a term indicating control information, a term indicating network entities, a term indicating an element of an apparatus, and the like are exemplified for convenience of explanation. Accordingly, the disclosure is not limited to the following terms and other terms having the same technical meaning may be used.

In addition, the disclosure includes terms used in some communication protocols (e.g. $3^{rd}$ Generation partnership project (3GPP)) to explain various embodiments, but the terms merely correspond to examples. Various embodiments may be easily modified to be applied to another communication system.

Figure 1:
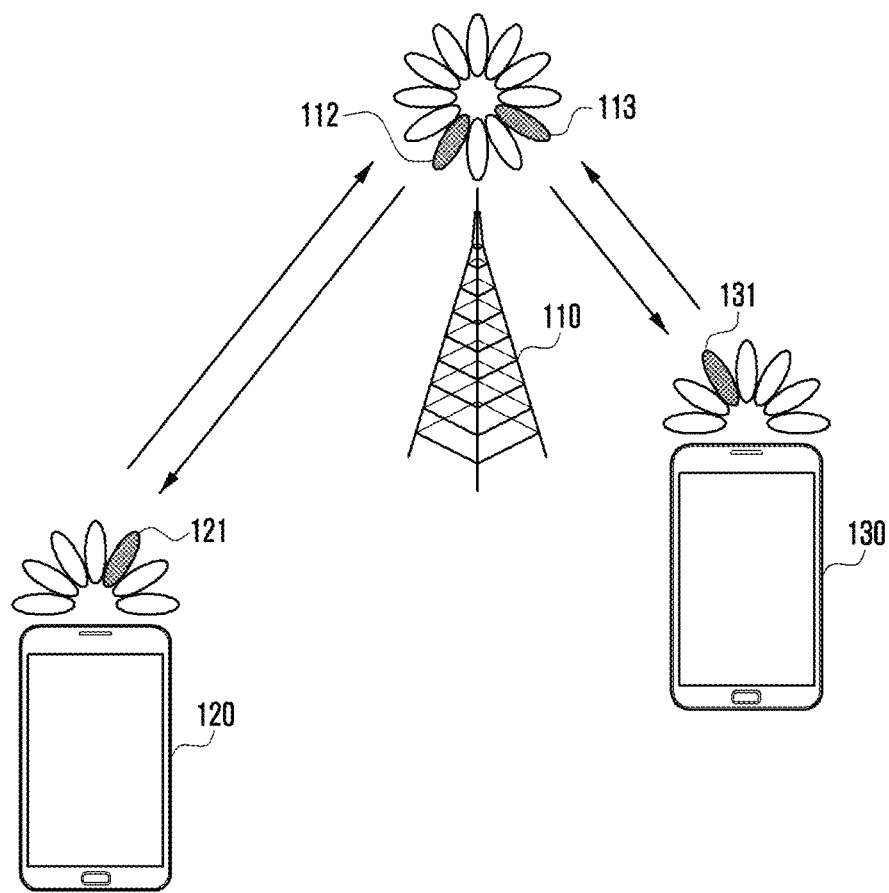
FIG. 1 illustrates a wireless communication system according to various embodiments.

FIG. 1 illustrates a wireless communication system according to various embodiments. FIG. 1 illustrates a base station 110, a terminal 120, and a terminal 130 as a part of nodes using wireless channels in a wireless communication system. FIG. 1 illustrates only one base station, but the system may further include another base station which is the same as or similar to the base station 110. FIG. 1 illustrates only two terminals, but the system may further include another terminal which is the same as or similar to the terminals 120 and 130.

The base station 110 is a network infrastructure that provides wireless connection to the terminals 120 and 130. The base station 110 has a coverage defined as a particular geographic area based on a distance by which the base station 110 can transmit a signal. The base station 110 may be called "an access point (AP)", "an eNodeB (eNB)", "a $5^{th}$ generation node", "a 5G nodeB (gNodeB, gNB)", "a wireless point", "a transmission/reception point (TRP)", or another term having a technical meaning equivalent thereto.

Each of the terminals 120 and 130 is a device used by a user and performs communication with the base station 110 through wireless channels. In some cases, at least one of the terminals 120 and 130 may be operated without involvement of a user. That is, at least one of the terminals 120 and 130 is a device configured to perform machine-type communication (MTC) and may not be carried by a user. Each of the terminals 120 and 130 may be called "a user equipment (UE)", "a mobile station", "a subscriber station", "a remote terminal', "a wireless terminal", "a user device", or another term having a technical meaning equivalent thereto.

The base station 110 and the terminals 120 and 130 may transmit and receive a wireless signal in sub 6 GHz bands and millimeter wave (mmWave) bands (e.g. 28 GHz, 30 GHz, 38 GHz, and 60 GHz). To improve the channel gain, the base station 110 and the terminals 120 and 130 may perform beamforming. Beamforming may include transmission beamforming and reception beamforming. That is, the base station 110 and the terminals 120 and 130 may give directivity to a transmission signal or a reception signal. To this end, the base station 110 and the terminals 120 and 130 may select serving beams 112, 113, 121, and 131 through a beam search procedure or a beam management procedure. Communication after the serving beams 112, 113, 121, and 131 are selected may be performed through resources having a quasi-co-located relationship with resources used to transmit the serving beams 112, 113, 121, and 131.

If large-scale characteristics of a channel having transferred a symbol on a first antenna port can be inferred from a channel having transferred a symbol on a second antenna port, the first antenna port and the second antennal port may be considered to have a QCL relationship therebetween. For example, the large-scale characteristics may include at least one of delay spread, Doppler spread, Doppler shift, average gain, average delay, and spatial receiver parameter.

Figure 2:
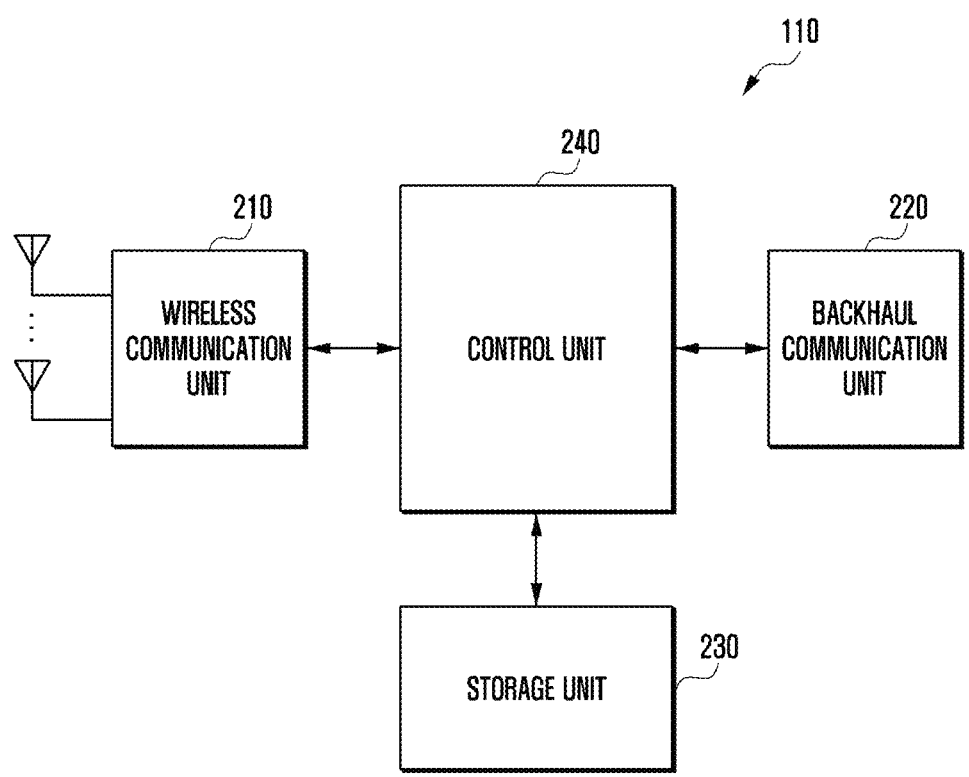
FIG. 2 illustrates a configuration of a base station in a wireless communication system according to various embodiments.

FIG. 2 illustrates a configuration of a base station in a wireless communication system according to various embodiments. The configuration illustrated in FIG. 2 may be understood as a configuration of the base station 110. The term " . . . unit" or the ending of a word, such as " . . . or", " . . . er", or the like used hereinafter may indicate a unit of processing at least one function or operation, and this may be embodied by hardware, software, or a combination of hardware and software.

Referring to FIG. 2, a base station includes a wireless communication unit 210, a backhaul communication unit 220, a storage unit 230, and a control unit 240.

The wireless communication unit 210 performs functions for transmitting or receiving a signal through a wireless channel. For example, the wireless communication unit 210 performs a function of conversion between a baseband signal and a bit stream according to a physical layer protocol of the system. For example, when data is transmitted, the wireless communication unit 210 generates complex symbols by encoding and modulating a transmission bit stream. Also, when data is received, the wireless communication unit 210 reconstructs a reception bit stream by demodulating and decoding a baseband signal.

Also, the wireless communication unit 210 up-converts a baseband signal into a radio-frequency (RF) band signal and then transmits the converted RF band signal through an antenna, and down-converts an RF band signal received through an antenna into a baseband signal. To this end, the wireless communication unit 210 may include a transmission filter, a reception filter, an amplifier, a mixer, an oscillator, a digital-to-analog convertor (DAC), an analog-to-digital convertor (ADC), and the like. Also, the wireless communication unit 210 may include a plurality of transmission/reception paths. Further, the wireless communication unit 210 may include at least one antenna array configured by multiple antenna elements.

In view of hardware, the wireless communication unit 210 may be configured by a digital unit and an analog unit, and the analog unit may include a plurality of sub-units according to operating power, operating frequency, etc. The digital unit may be implemented by at least one processor (e.g. digital signal processor (DSP)).

The wireless communication unit 210 transmits and receives a signal, as described above. Accordingly, the entirety or a part of the wireless communication unit 210 may be called "a transmission unit (transmitter)", a reception unit (receiver)", or "a transceiver unit (transceiver)". Also, in the following description, transmission and reception through a wireless channel may be understood to include the aforementioned processing of the wireless communication unit 210.

The backhaul communication unit 220 provides an interface performing communication with other nodes within a network. That is, the backhaul communication unit 220 converts, into a physical signal, a bit stream transmitted from the base station to another node, for example, another access node, another base station, a higher node, a core network, etc., and converts a physical signal received from another node into a bit stream.

The storage unit 230 stores data such as a basic program, an application program, and configuration information for the operation of the base station. The storage unit 230 may be configured as a volatile memory, a non-volatile memory, or a combination of a volatile memory and a non-volatile memory. The storage unit 230 provides stored data in response to a request of the control unit 240.

The control unit 240 controls overall operations of the base station. For example, the control unit 240 transmits and receives a signal through the wireless communication unit 210 or the backhaul communication unit 220. Further, the control unit 240 records and reads data in and from the storage unit 230. In addition, the control unit 240 may perform functions of a protocol stack required in a communication protocol. According to another embodiment, the protocol stack may be included in the wireless communication unit 210. To this end, the control unit 240 may include at least one processor.

According to various embodiments, the control unit 240 may transmit radio resource control (RRC) configuration information to the terminal 110. For example, the control unit 240 may control the base station to perform operations according to various embodiments described later.

Figure 3:
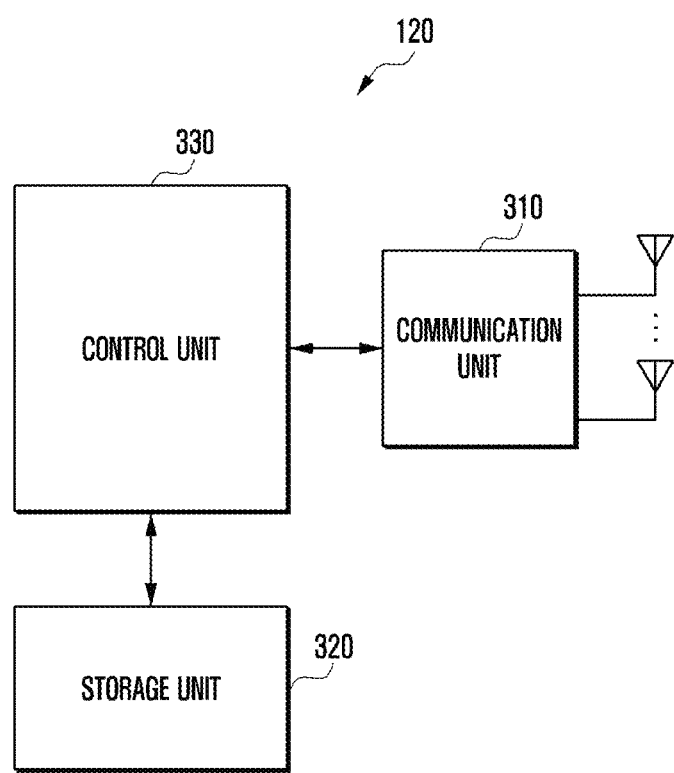
FIG. 3 illustrates a configuration of a terminal in a wireless communication system according to various embodiments.

FIG. 3 illustrates a configuration of a terminal in a wireless communication system according to various embodiments. The configuration illustrated in FIG. 3 may be understood as a configuration of the terminal 120 or 130. The term " . . . unit" or the ending of a word, such as " . . . or", " . . . er", or the like used hereinafter may indicate a unit of processing at least one function or operation, and this may be embodied by hardware, software, or a combination of hardware and software.

Referring to FIG. 3, a terminal includes a communication unit 310, a storage unit 320, and a control unit 330.

The communication unit 310 performs functions for transmitting or receiving a signal through a wireless channel. For example, the communication unit 310 performs a function of conversion between a baseband signal and a bit stream according to a physical layer protocol of the system. For example, when data is transmitted, the communication unit 310 generates complex symbols by encoding and modulating a transmission bit stream. Also, when data is received, the communication unit 310 reconstructs a reception bit stream by demodulating and decoding a baseband signal. Also, the communication unit 310 up-converts a baseband signal into an RF band signal and then transmits the converted RF band signal through an antenna, and down-converts an RF band signal received through an antenna into a baseband signal. For example, the communication unit 310 may include a transmission filter, a reception filter, an amplifier, a mixer, an oscillator, a DAC, an ADC, and the like.

Also, the communication unit 310 may include a plurality of transmission/reception paths. Further, the communication unit 310 may include at least one antenna array configured by multiple antenna elements. In view of hardware, the communication unit 310 may be configured by a digital circuit and an analog circuit (e.g. radio frequency integrated circuit (RFIC)). The digital circuit and the analog circuit may be implemented as a single package. Also, the communication unit 310 may include a plurality of RF chains. Further, the communication unit 310 may perform beamforming.

Also, the communication unit 310 may include different communication modules to process signals having different frequency bands. Further, the communication unit 310 may include a plurality of communication modules to support a plurality of different radio access technologies. For example, the different radio access technologies may include Bluetooth low energy (BLE), wireless fidelity (Wi-Fi), WiFi gigabyte (WiGig), a cellular network (e.g., long term evolution (LTE), and the like. Further, the different frequency bands may include a super high frequency (SHF) (e.g. 2.5 GHz and 5 GHz) band and a millimeter (mm) wave (e.g. 60 GHz) band.

The communication unit 310 transmits and receives a signal, as described above. Accordingly, the entirety or a part of the communication unit 310 may be called "a transmission unit", "a reception unit", or "a transceiver unit". Also, in the following description, transmission and reception through a wireless channel may be understood to include the aforementioned processing of the communication unit 310.

The storage unit 320 stores data such as a basic program, an application program, and configuration information for the operation of the terminal. The storage unit 320 may be configured as a volatile memory, a non-volatile memory, or a combination of a volatile memory and a non-volatile memory. The storage unit 320 provides stored data in response to a request of the control unit 330.

The control unit 330 controls overall operations of the terminal. For example, the control unit 330 transmits and receives a signal through the communication unit 310. Further, the control unit 330 records and reads data in and from the storage unit 320. In addition, the control unit 330 may perform functions of a protocol stack required in a communication protocol. To this end, the control unit 330 may include at least one processor or microprocessor, or may be a part of a processor. Also, the control unit 330 and a part of the communication unit 310 may be called a communication processor (CP).

According to various embodiments, if the terminal 120 configures a sidelink unicast session with another terminal, the control unit 330 may perform a procedure of determining whether the terminal 120 is located in the coverage of the base station and then obtaining an RLC transmission mode and RLC configuration information of the sidelink unicast session from the base station and a procedure of determining that the terminal 120 is not located in the coverage of the base station and then obtaining pre-configured RLC transmission mode and RLC configuration information according to a V2X service profile. For example, the control unit 330 may control the terminal to perform operations according to various embodiments described later.

Figure 4A:
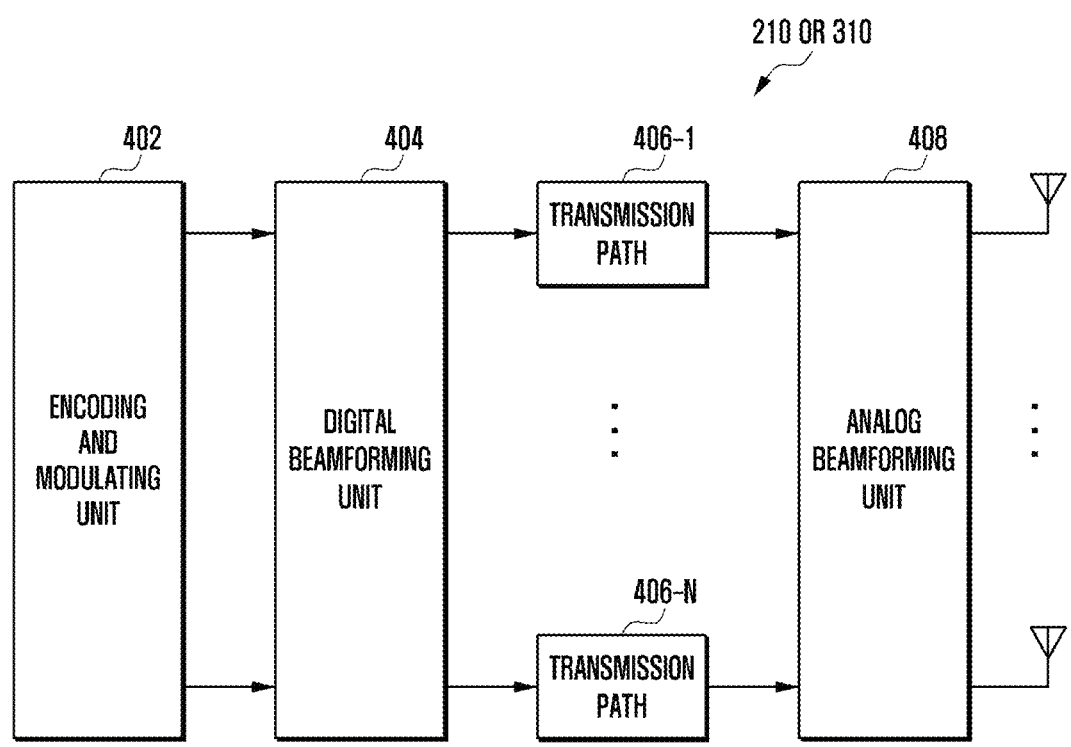
FIGS. 4A to 4C illustrate a configuration of a communication unit in a wireless communication system according to various embodiments.
Figure 4B:
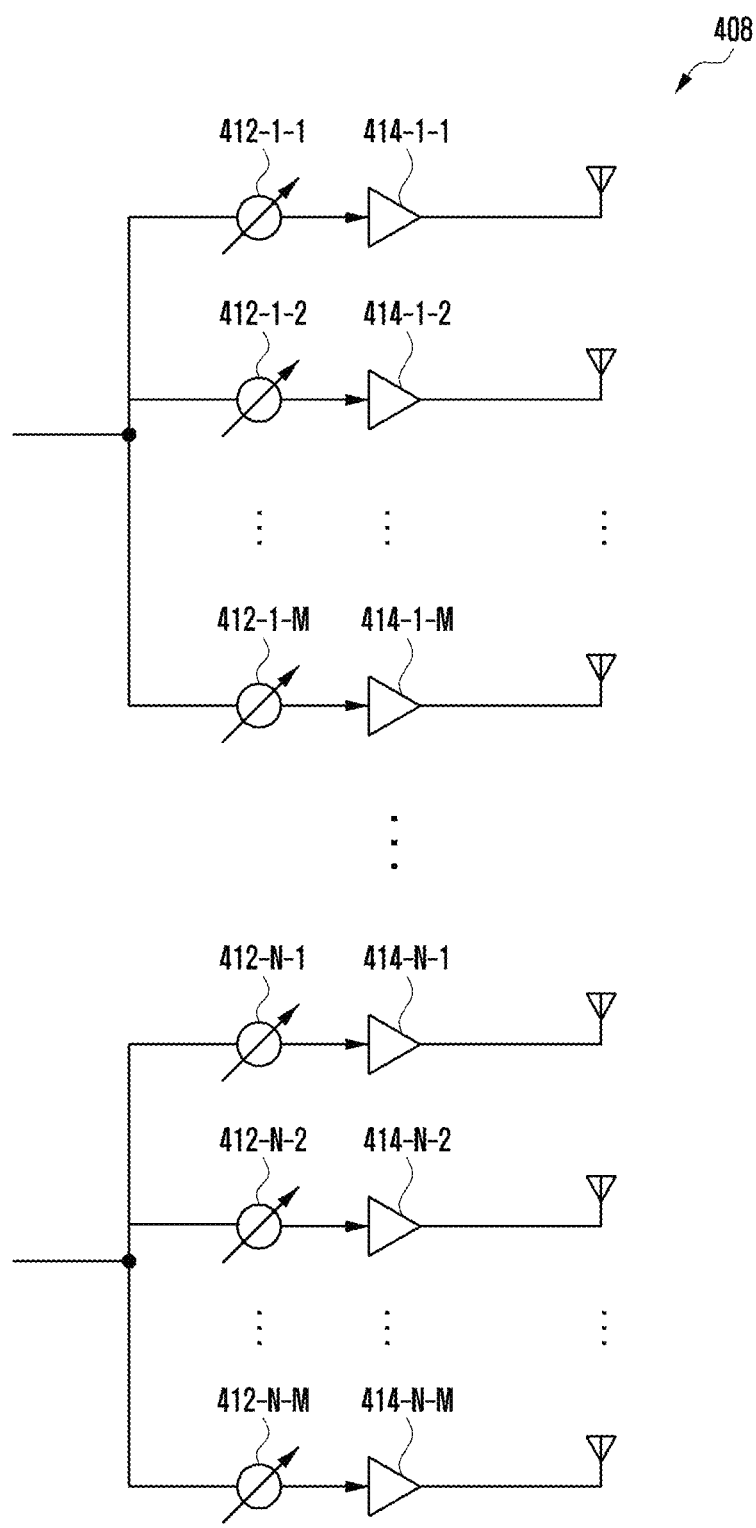
Figure 4C:
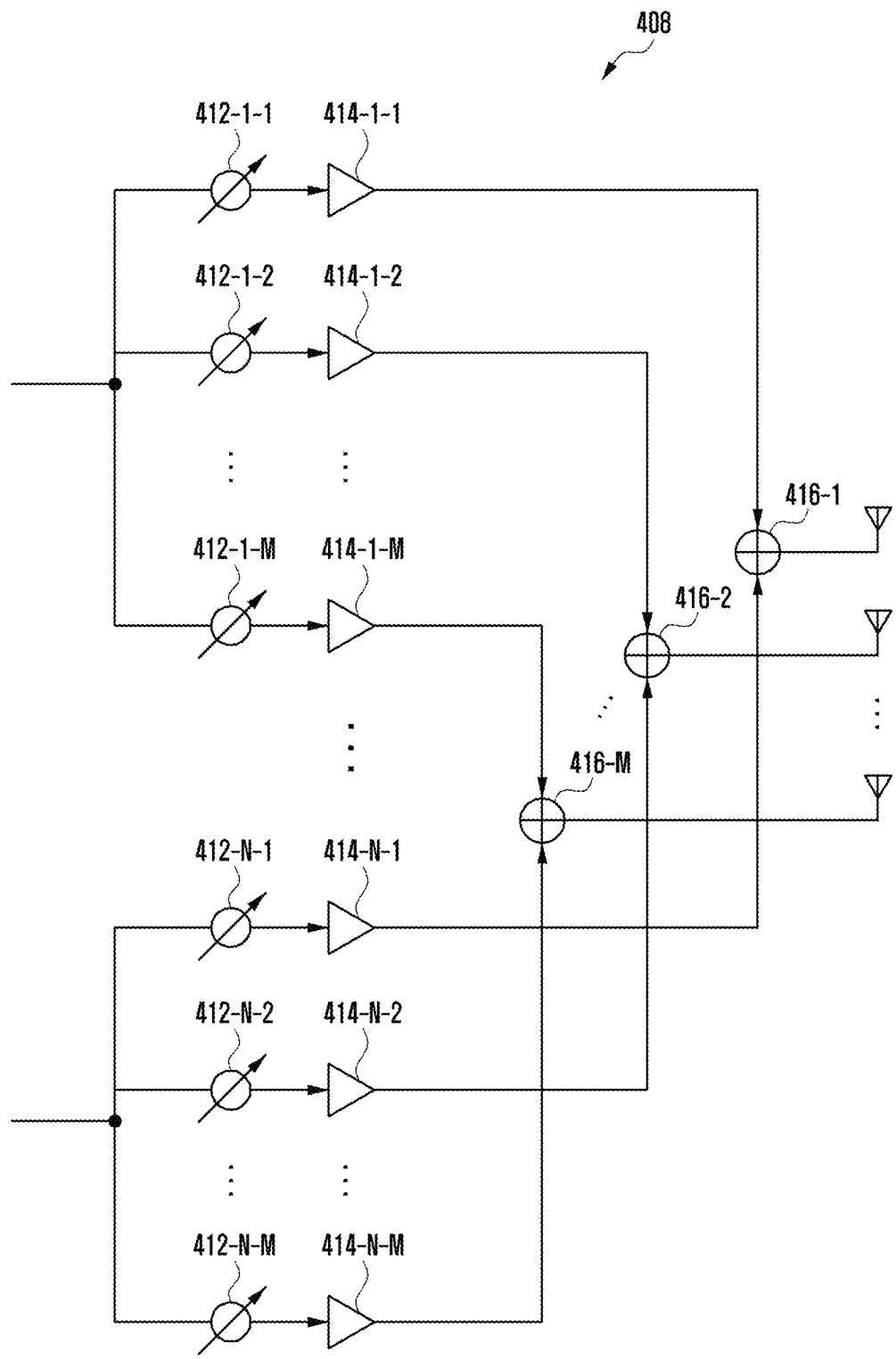

FIGS. 4A to 4C illustrates a configuration of a communication unit in a wireless communication system according to various embodiments. FIGS. 4A to 4C illustrate examples of a specific configuration of the wireless communication unit 210 in FIG. 2 or the communication unit 310 in FIG. 3. Specifically, FIGS. 4A to 4C illustrate elements performing beamforming, which are a part of the wireless communication unit 210 in FIG. 2 or the communication unit 310 in FIG. 3.

Referring to FIG. 4A, the wireless communication unit 210 or the communication unit 310 includes an encoding and modulating unit 402, a digital beamforming unit 404, a plurality of transmission paths 406-1 to 406-N, and an analog beamforming unit 408.

The encoding and modulating unit 402 performs channel encoding. For channel encoding, at least one of a low density parity check (LDPC) code, a convolution code, and a polar code may be used. The encoding and modulating unit 402 generates modulation symbols by performing constellation mapping.

The digital beamforming unit 404 performs beamforming on a digital signal (e.g. modulation symbols). To this end, the digital beamforming unit 404 multiplies beamforming weights to the modulation symbols. The beamforming weights are used for changing the size and the phase of a signal, and may be called "a precoding matrix", "a precoder", etc. The digital beamforming unit 404 outputs, to the plurality of transmission paths 406-1 to 406-N, the modulation symbols, which have been subjected to digital beamforming. According to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert, into analog signals, digital signals having been subjected to digital beamforming. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is designed for an orthogonal frequency division multiplexing (OFDM) scheme, and may be excluded in another physical layer scheme (e.g., filter bank multi-carrier (FBMC)). That is, the plurality of transmission paths 406-1 to 406-N provide independent signal processing processes for multiple streams generated through digital beamforming, respectively. However, according to an implementation method, a part of the elements of the plurality of transmission paths 406-1 to 406-N may be shared.

The analog beamforming unit 408 performs beamforming on an analog signal. To this end, the digital beamforming unit 404 multiplies beamforming weights to analog signals. The beamforming weights are used for changing the size and the phase of a signal. Specifically, according to a connection structure between the plurality of transmission paths 406-1 to 406-N and antennas, the analog beamforming unit 408 may be configured as illustrated in FIG. 4B or FIG. 4C.

Referring to FIG. 4B, signals input to the analog beamforming unit 408 undergo phase/size conversion and an operation of amplification, and are then transmitted through antennas. The signals in the paths are transmitted through different antenna sets, that is, antenna arrays. In relation to processing of a signal input through a first path, the signal is converted into a signal stream including signals having an identical phase or size or different phases or sizes by phase/size conversion units 412-1-1 to 412-1-M, the converted signals included in the signal stream are amplified by amplifiers 414-1-1 to 414-1-M, and then the amplified signals are transmitted through antennas, respectively.

Referring to FIG. 4C, signals input to the analog beamforming unit 408 undergo phase/size conversion and an operation of amplification, and are then transmitted through antennas. The signals in the paths are transmitted through an identical antenna set, that is, an antenna array. In relation to processing of a signal input through a first path, the signal is converted into a signal stream including signals having an identical phase or size or different phases or sizes by phase/size conversion units 412-1-1 to 412-1-M, and the converted signals included in the signal stream are amplified by amplifiers 414-1-1 to 414-1-M. In order to be transmitted through a single antenna array, amplified signals are added together based on antenna elements by adding units 416-1-1 to 416-1-M, and then the added signals are transmitted through the antennas, respectively.

FIG. 4B illustrates an example of using independent antenna arrays for transmission paths, and FIG. 4C illustrates an example of sharing a single antenna array between transmission paths. However, according to another embodiment, some transmission paths may use independent antenna arrays, and the remaining transmission paths may share a single antenna array. Further, according to yet another embodiment, a switchable structure between transmission paths and antenna arrays may be applied thereby allowing use of a structure which is changeable adaptively according to a situation.

A V2X service may be divided into a basic safety service and an advanced service. The basic safety service may correspond to detailed services including a vehicle notification (CAM or BSM) service, a left-turn notification service, a proceeding vehicle collision warning service, an emergency vehicle approach notification service, a front obstacle warning service, an intersection signal information service, and the like. Further, the basic safety service is designed to transmit or receive V2X information by using a broadcast transmission scheme and may support the transmission or reception by using a conventional 4G-based V2X communication scheme. The advanced service not only needs tightened QoS requirements more than those of the basic safety service, but also requires a method of transmitting or receiving V2X information by using unicast and groupcast transmission schemes allowing transmission or reception of V2X information in a particular vehicle group or between two vehicles. The advanced service may correspond to detailed services including a group driving service, a self-driving service, a remote driving service, an extended sensor-based V2X service, and the like. In the disclosure, a method for supporting, for a vehicle-to-vehicle direct communication, a unicast communication scheme required for an advanced service will be described according to various embodiments. In the disclosure, a vehicle-to-vehicle direct communication scheme which differentiates between a basic safety service and an advanced service will be described according to various embodiments.

FIG. 5 illustrates direct communication between terminals by a unicast scheme according to various embodiments.

FIG. 5 illustrates four scenarios to which embodiments can be applied.

(5-1) The terminals 120 and 130 located in the coverage of the base station 110 may perform unicast type direct communication. According to an embodiment, the base station 110 may manage sidelink resource information and configuration information of a transmission mode (RLC AM mode or RLC UM mode) of a radio link control (RLC) layer, the pieces of information being used to perform a unicast type direct communication by the terminals 120 and 130.

(5-2) The terminal 120 located in the coverage of the base station 110 and the terminal 130 not located in the base station coverage may perform unicast type direct communication. According to an embodiment, the base station 110 may manage sidelink resource information and configuration information of an RLC layer transmission mode, the pieces of information being used to perform a unicast type direct communication by the terminals 120 and 130.

(5-3) The terminals 120 and 130 which are not located in the coverage of the base station 110 may perform unicast type direct communication. According to an embodiment, the terminals 120 and 130 may obtain a pre-configured sidelink resource used to perform a unicast type direct communication, determine an RLC layer transmission mode, and obtain pre-configured RLC configuration information corresponding to the determined RLC layer transmission mode.

(5-4) The terminal 120 located in the coverage of the base station 110 and a terminal 160 located in the coverage of a base station 150 may perform unicast type direct communication. According to an embodiment, the base stations 110 and 150 may manage and exchange sidelink resource information and configuration information of an RLC layer transmission mode, the pieces of information being used to perform a unicast type direct communication by the terminals 120 and 160, and may transfer the pieces of information to the corresponding terminal located in the coverage of each of the base stations 110 and 150.

Detailed operations for scenarios (5-1), (5-2), (5-3), and (5-4) may be performed as described below.

A transmission terminal may obtain sidelink resource information and configuration information of an RLC layer transmission mode, which are used to perform a unicast type direct communication by the transmission terminal, through at least one route among a route of obtaining the pieces of information from a base station and a route of obtaining the pieces of information from pre-configured information. The configuration information may include at least one of transmission-specific information (information used for transmission) and information which should be shared by the transmission terminal and a corresponding reception terminal. A reception terminal may obtain sidelink resource information and configuration information of an RLC layer transmission mode, which are used to perform a unicast type direct communication by the reception terminal, through at least one route among a route of obtaining the pieces of information from a base station, a route of obtaining the pieces of information from pre-configured information, and a route of randomly configuring the pieces of information by the terminal. The configuration information may include reception-specific information. The operations may be applied to a transmission terminal and a reception terminal located in the coverage of a base station and a transmission terminal and a reception terminal not located in the coverage of a base station.

Detailed operations for scenarios (5-1) may include the following operations.

The terminal 120 or 130 may obtain, from the base station 110, sidelink resource information and configuration information of an RLC layer transmission mode, which are used for performing a unicast type direct communication. If the terminal 120 or 130 is a transmission terminal of a direct uncast communication, the terminal 120 or 130 may obtain, from the base station 110, the sidelink resource information and configuration information according to the RLC layer transmission mode. If the terminal 120 or 130 is a reception terminal of a direct uncast communication, the terminal 120 or 130 may obtain, from the base station 110, at least one of ARQ feedback configuration information and reception-specific configuration information according to the RLC layer transmission mode of the sidelink direct communication. If the terminal 120 or 130 is a reception terminal of a direct uncast communication, the terminal 120 or 130 may randomly configure at least one of ARQ feedback configuration information and reception-specific configuration information according to the RLC layer transmission mode of the sidelink direct communication. If the terminal 120 or 130 is a reception terminal of a direct uncast communication, the terminal 120 or 130 may obtain pre-configured reception-specific configuration information according to an RLC layer transmission mode, which is used for performing unicast type direct communication.

Detailed operations for scenarios (5-2) may include the following operations.

The terminal 120 may obtain, from the base station 110, sidelink resource information and configuration information of an RLC layer transmission mode, which are used for performing a unicast type direct communication. The terminal 130 may obtain pre-configured sidelink resource information and pre-configured configuration information of an RLC layer transmission mode, which are used for performing a unicast type direct communication. If the terminal 120 is a transmission terminal of a direct uncast communication, the terminal 120 may obtain, from the base station 110, sidelink resource information and configuration information of an RLC layer transmission mode, which are used for performing unicast type direct communication. If the terminal 130 is a reception terminal of a direct uncast communication, the terminal 130 may obtain pre-configured reception-specific configuration information according to an RLC layer transmission mode, which is used for performing unicast type direct communication. If the terminal 130 is a reception terminal of a direct uncast communication, the terminal 130 may randomly configure reception-specific configuration information according to an RLC layer transmission mode, which is used for performing unicast type direct communication.

If the terminal 120 is a reception terminal of a direct uncast communication, the terminal 120 may obtain, from the base station 110, reception-specific configuration information according to an RLC layer transmission mode, which is used for performing unicast type direct communication. If the terminal 120 is a reception terminal of a direct uncast communication, the terminal 120 may obtain pre-configured reception-specific configuration information according to an RLC layer transmission mode, which is used for performing unicast type direct communication. If the terminal 120 is a reception terminal of a direct uncast communication, the terminal 120 may randomly configure reception-specific configuration information according to an RLC layer transmission mode, which is used for performing unicast type direct communication. If the terminal 130 is a transmission terminal of a direct uncast communication, the terminal 130 may obtain pre-configured configuration information according to an RLC layer transmission mode, which is used for performing unicast type direct communication.

Detailed operations for scenarios (5-3) may include the following operations.

If the terminal 120 or 130 is a transmission terminal of a direct uncast communication, the terminal 120 or 130 may obtain pre-configured configuration information according to an RLC layer transmission mode, which is used for performing unicast type direct communication. If the terminal 120 or 130 is a reception terminal of a direct uncast communication, the terminal 120 or 130 may obtain pre-configured reception-specific configuration information according to an RLC layer transmission mode, which is used for performing unicast type direct communication. If the terminal 120 or 130 is a reception terminal of a direct uncast communication, the terminal 120 or 130 may randomly configure reception-specific configuration information according to an RLC layer transmission mode, which is used for performing unicast type direct communication.

Detailed operations for scenarios (5-4) may include the following operations.

The terminal 120 may obtain, from the base station 110, sidelink resource information and configuration information of an RLC layer transmission mode, which are used for performing a unicast type direct communication. The terminal 160 may obtain, from the base station 150, sidelink resource information and configuration information of an RLC layer transmission mode, which are used for performing a unicast type direct communication.

If the terminal 120 is a transmission terminal of a direct uncast communication, the terminal 120 may obtain, from the base station 110, sidelink resource information and configuration information of an RLC layer transmission mode, which are used for performing unicast type direct communication. If the terminal 160 is a reception terminal of a direct uncast communication, the terminal 160 may obtain, from the base station 150, reception-specific configuration information according to an RLC layer transmission mode, which are used for performing unicast type direct communication. If the terminal 160 is a reception terminal of a direct uncast communication, the terminal 160 may obtain pre-configured reception-specific configuration information according to an RLC layer transmission mode, which is used for performing unicast type direct communication. If the terminal 160 is a reception terminal of a direct uncast communication, the terminal 160 may randomly configure reception-specific configuration information according to an RLC layer transmission mode, which is used for performing unicast type direct communication.

If the terminal 160 is a transmission terminal of a direct uncast communication, the terminal 160 may obtain, from the base station 150, sidelink resource information and configuration information of an RLC layer transmission mode, which are used for performing unicast type direct communication. If the terminal 120 is a reception terminal of a direct uncast communication, the terminal 120 may obtain, from the base station 110, reception-specific configuration information according to an RLC layer transmission mode, which are used for performing unicast type direct communication. If the terminal 120 is a reception terminal of a direct uncast communication, the terminal 120 may obtain pre-configured reception-specific configuration information according to an RLC layer transmission mode, which is used for performing unicast type direct communication. If the terminal 120 is a reception terminal of a direct uncast communication, the terminal 120 may randomly configure reception-specific configuration information according to an RLC layer transmission mode, which is used for performing unicast type direct communication.

FIG. 6 illustrates configuring a session for unicast transmission between terminals according to various embodiments.

Referring to FIG. 6, (1) the terminal 120 may perform a V2X service registration procedure with a V2X server or a V2X control center. (2) The terminal 130 may perform a V2X service registration procedure with the V2X server or the V2X control center. (3) The terminals 120 and 130 may perform a unicast session establishment procedure to receive an identical V2X service in a unicast scheme. The unicast session establishment procedure indicated by the number (3) may include a 2-way transaction of transmitting a unicast session request message by the terminal 120, as indicated by the number (3-1), and transmitting a unicast session response message in response to the unicast session request message by the terminal 130, as indicated by the number (3-2), or may include a 3-way transaction of transmitting a unicast session confirm message in response to the unicast session response message by the terminal 120. The above description is made under the assumption that the terminal 120 transmits the unicast session request message, but either of the terminals 120 and 130 can transmit a unicast session request message. In a case of a group driving service, a terminal of a leader vehicle during corresponding group driving may transmit a unicast session request message and a terminal of a following vehicle may transmit a unicast session response message, so that a unicast session is established. In another embodiment, a terminal of a following vehicle during corresponding group driving may transmit a unicast session request message and a terminal of a leader vehicle may transmit a unicast session response message, so that a unicast session is established. Detailed description for various embodiments of a unicast session establishment procedure for the other V2X services will be omitted in the disclosure.

According to an embodiment, the terminals 120 and 130 may perform a procedure for configuring an RLC transmission mode during the unicast session establishment procedure indicated by the number (3).

According to another embodiment, the terminals 120 and 130 may perform a procedure for configuring an RLC transmission mode after the unicast session establishment procedure indicated by the number (3).

Session information obtained by the terminals 120 and 130 through the unicast session establishment indicated by the number (3) may include at least one of the following contents.

Session identifier (session ID), transmission type (unicast, broadcast, and groupcast information), destination identifier (DST ID), and source identifier (SRC ID)

A session identifier may indicate a unicast session identifier established between the two terminals. If the two terminals perform a unicast transmission, the terminals obtain an identical session identifier.

A transmission type may indicate one of unicast, groupcast, and broadcast.

A destination identifier may indicate a destination identifier of a V2X service to be serviced through the unicast session established between the two terminals. If the two terminals perform a unicast transmission, the terminals obtain an identical destination identifier.

A source identifier may indicate a source identifier of a V2X service to be serviced through the unicast session established between the two terminals. If the two terminals perform a unicast transmission, the terminals obtain an identical source identifier.

If the session identifier, the destination identifier, or the source identifier includes transmission type information, the above described transmission type information may be omitted.

Base station identifier: if it is determined that each of the two terminals is located in a base station coverage, each of the two terminals may provide the opposite terminal with identifier information of its own serving base station. The base station identifier may include at least one of a base station ID, a cell ID, cell frequency band information, and bandwidth part (BWP) information.

TX profile: a sidelink transmission profile which the two terminals are to apply to the unicast session (a TX profile may include sidelink protocol version information, a RAT configuration index of a sidelink protocol, or the like. The sidelink protocol version information may indicate a 3GPP sidelink version number such as rel-14, rel-15, rel-16, . . . ; LTE-V2X, LTE-eV2X, NR-V2X, . . . ; V2X Phase 1, V2X phase 2, V2X phase 3, . . . ; or Rel-14 compatible, Rel-14 non-compatible, Rel-15 non-compatible, Rel-16 compatible. The RAT configuration index of a sidelink protocol may indicate information indicating a radio profile (MCS, TX parameter, RX parameter, etc.) of a sidelink.)

FIGS. 7A to 7F illustrate a terminal-to-base station signaling procedure for configuring an RLC transmission mode for unicast transmission between terminals according to various embodiments.

FIGS. 7A to 7F illustrate embodiments for configuring an RLC transmission mode for unicast transmission according to four scenarios illustrated in FIG. 5.

Figure 7A:
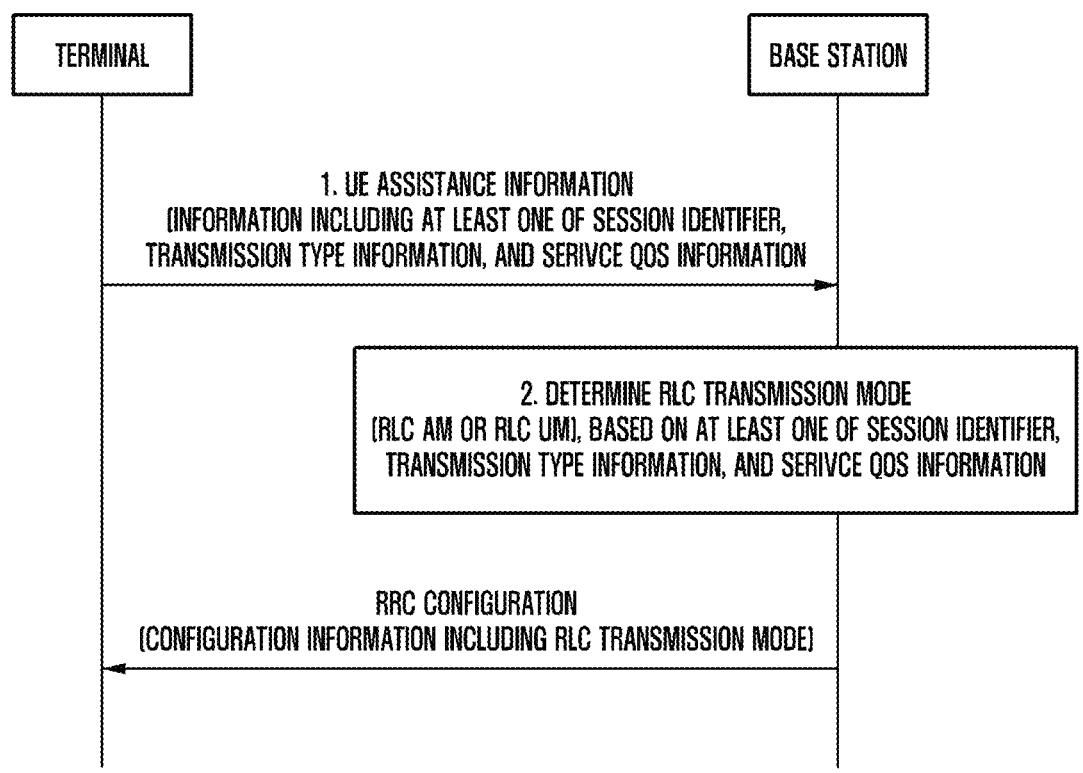
FIGS. 7A to 7F illustrate a terminal-to-base station signaling procedure for configuring an RLC transmission mode for unicast transmission between terminals according to various embodiments.

FIG. 7A illustrates an embodiment in which if a terminal is in an RRC-connected state, the terminal obtains RLC configuration information for sidelink unicast transmission from a base station. To achieve the above purpose, (1) the terminal may transmit a UE assistance information message to the base station. The UE assistance information message may include at least one of unicast session information (identifier), transmission type information (unicast, groupcast, and broadcast), service QoS information, and preferred RLC mode information of the terminal. (2) The base station may configure an RLC transmission mode and RLC configuration which the terminal is to apply to a sidelink unicast transmission, on the basis of the information included in the UE assistance information message. (3) The base station may transmit, to the terminal, an RRC configuration message including the RLC transmission mode and RLC configuration information for unicast sidelink, which are determined in the operation indicated by the number (2).

An operation of determining an RLC transmission mode and configuration required for unicast sidelink by the base station in the operation indicated by the number (2) is performed as follow.

1. An RLC AM mode determination condition may include at least one of the following embodiments.

(1) A session identifier or transmission type information indicates a terminal-to-terminal unicast transmission.

(2) Service QoS information (data rate, reliability, latency, communication range, and priority) indicates a terminal-to-terminal unicast transmission.

(3) Service QoS information (data rate, reliability, latency, communication range, and priority) indicates a particular data rate, a particular reliability, a particular latency time, a particular communication range, or a particular priority.

(In an embodiment, the base station may manage a reference value of a particular data rate, a particular reliability, a particular latency time, a particular communication range, or a particular priority, in which RLC AM mode should be operated. In another embodiment, a reference value of a particular data rate, a particular reliability, a particular latency time, a particular communication range, or a particular priority in which RLC AM mode should be operated may be pre-configured.)

(4) A service identifier, an application identifier, a destination identifier, or a source identifier indicates a terminal-to-terminal unicast transmission.

(5) A service identifier, an application identifier, a destination identifier, or a source identifier indicates RLC AM mode.

(In an embodiment, the base station may manage information relating to a particular service, a particular application, a particular destination, or a particular source in which RLC AM mode should be operated. In another embodiment, information relating to a particular service, a particular application, a particular destination, or a particular source in which RLC AM mode should be operated may be pre-configured.

(6) Preferred RLC mode information of the terminal indicates RLC AM mode.

2. An embodiment of determining an RLC transmission mode of the terminal by the base station may include at least one of the following contents.

In an embodiment, UE assistance information may include session information (identifier) and transmission type information which are obtained in unicast session establishment. The base station may determine RLC AM mode or RLC UM mode from a corresponding session identifier and the transmission type information. For example, if it is determined that the session identifier and the transmission type information require terminal-to-terminal unicast transmission based on RLC AM, the base station may configure RLC AM mode.

In another embodiment, UE assistance information may include a session identifier, transmission type information, and service QoS information (data rate, reliability, latency, communication range, priority, etc.) which are obtained in unicast session establishment. The base station may determine RLC AM mode or RLC UM mode, based on the session identifier, transmission type information, and service QoS information. For example, if it is determined that the session identifier, transmission type information, and service QoS information require terminal-to-terminal unicast transmission based on RLC AM, the base station may configure RLC AM mode.

In another embodiment, UE assistance information may include at least one of a session identifier, transmission type information, service QoS information (data rate, reliability, latency, communication range, priority, etc.), a service identifier, an application identifier, a destination identifier, and a source identifier which are obtained in unicast session establishment. The base station may determine RLC AM mode or RLC UM mode, based on the at least one of a session identifier, transmission type information, service QoS information, a service identifier, an application identifier, a destination identifier, and a source identifier. For example, if it is determined that the service identifier requires terminal-to-terminal unicast transmission based on RLC AM, the base station may configure RLC AM mode. For another example, if it is determined that the destination identifier requires terminal-to-terminal unicast transmission based on RLC AM, the base station may configure RLC AM mode.

In another embodiment, UE assistance information may include at least one of a session identifier, transmission type information, service QoS information (data rate, reliability, latency, communication range, priority, etc.), a service identifier, an application identifier, a destination identifier, a source identifier, and preferred RLC mode information of the terminal, which are obtained in unicast session establishment. The base station may configure RLC AM mode or RLC UM mode, based on the information.

Figure 7B:
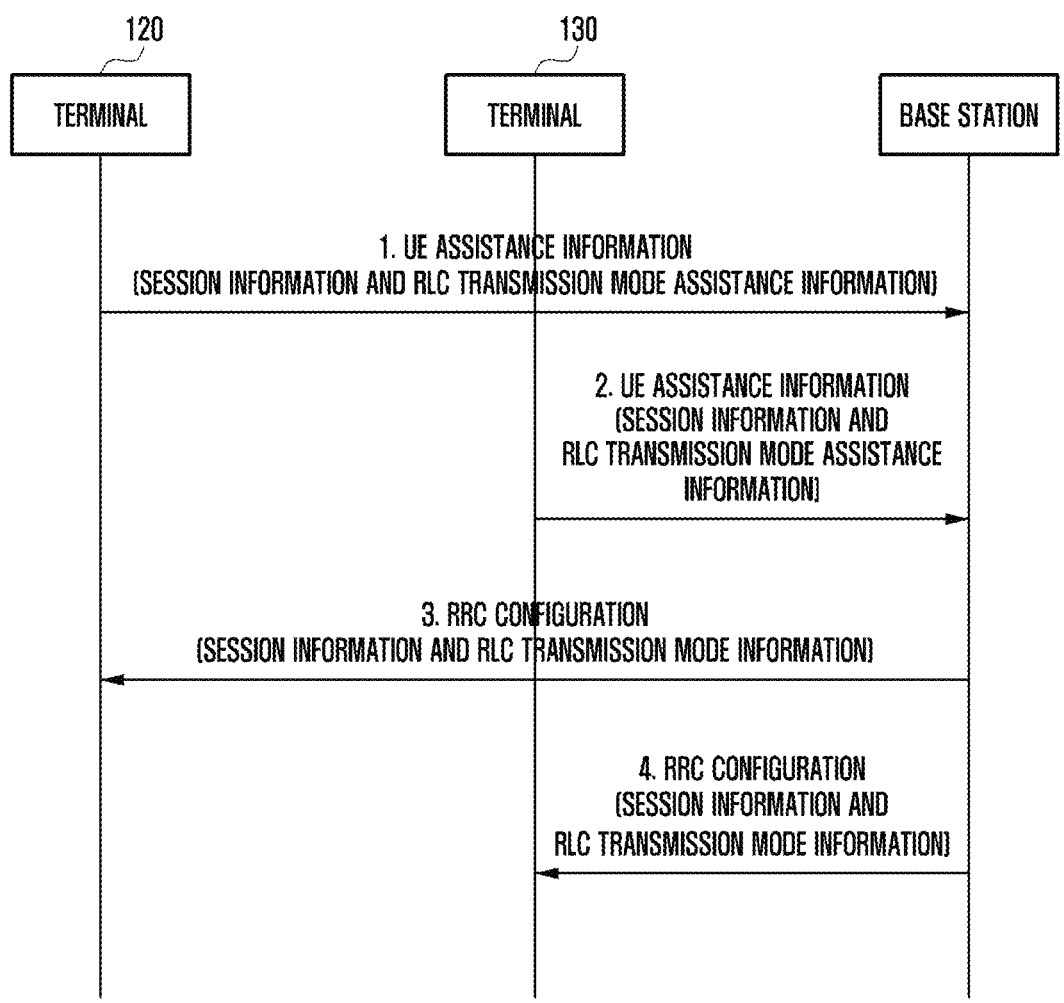

FIG. 7B illustrates an embodiment in which, if it is determined that each of the terminals 120 and 130 having obtained unicast session information according to the embodiment illustrated in FIG. 6 is located in a base station coverage, obtaining RLC transmission mode configuration information for unicast session from a base station.

(1) The terminal 120 may transmit a UE assistance information message to a base station. The UE assistance information message may include a base station identifier, RLC transmission mode assistance information, and unicast session information, for example, at least one information among a session identifier, a destination identifier, a source identifier, and a transmission type. According to an embodiment, a base station identifier may correspond to at least one of a base station ID, a cell ID, cell frequency band information, and bandwidth part (BWP) information. (2) The terminal 130 may transmit a UE assistance information message to the base station. The UE assistance information message may include a base station identifier, RLC transmission mode assistance information, and unicast session information, for example, at least one information among a session identifier, a destination identifier, a source identifier, and a transmission type. (3) If the base station receives a UE assistance information message including session information or RLC transmission mode assistance information from the terminals 120 and 130 and the message includes a base station identifier, the base station may determine that RLC information configuration for unicast transmission with a terminal located in the coverage of an adjacent base station is required. If the UE assistance information message does not include a base station identifier, the base station may determine that RLC information configuration for unicast transmission with a terminal located in the coverage of the same base station is required.

The base station may determine, through session information, that is, an identical session identifier, an identical destination identifier, an identical source identifier, and a transmission type, that the two terminals are to perform a sidelink unicast transmission. The base station may determine an RLC transmission mode for sidelink unicast of the terminals 120 and 130. The base station may select one of RLC AM mode (acknowledge mode) or RLC UM mode (unacknowledged mode) as an RLC transmission mode. The base station may configure sidelink RLC configuration information according to a selected RLC transmission mode.

If the base station selects RLC AM mode, RLC config indicating RLC configuration information may be configured as below while including sidelink RLC configuration of TX and RX.

An embodiment of RLC configuration information for sidelink is as follows.

```
SL RLC-BearerConfig ::=            SEQUENCE {
    logicalChannelIdentity             LogicalChannelIdentity
    servedRadioBearer                  SLRB-Identity
    SL_rlc-Config                      SL_RLC-Config
    mac-LogicalChannelConfig           LogicalChannelConfig
}
SL_RLC-Config ::=                  CHOICE {
    am                                 SL-AM-RLC,
    um                                 SL-UM-RLC
}
SL-AM-RLC ::=                      SEQUENCE {
//TX and RX
    sn-FieldLength                     SN-FieldLengthAM,
    t-PollRetransmit                   T-PollRetransmit,
    pollPDU                            PollPDU
    pollByte                           PollByte,
    maxRetxThreshold                   ENUMERATED { t1, t2, t3, t4, t6, t8, t16, t32 },
    t-Reassembly                       T-Reassembly,
    t-StatusProhibit                   T-StatusProhibit
}
```

```
T-PollRetransmit ::=           ENUMERATED {
                                   ms5, ms10, ms15, ms20, ms25, ms30, ms35,
                                   ms40, ms45, ms50, ms55, ms60, ms65, ms70,
                                   ms75, ms80, ms85, ms90, ms95, ms100, ms105,
                                   ms110, ms115, ms120, ms125, ms130, ms135,
                                   ms140, ms145, ms150, ms155, ms160, ms165,
                                   ms170, ms175, ms180, ms185, ms190, ms195,
                                   ms200, ms205, ms210, ms215, ms220, ms225,
                                   ms230, ms235, ms240, ms245, ms250, ms300,
                                   ms350, ms400, ms450, ms500, ms800, ms1000,
                                   ms2000, ms4000, spare5, spare4, spare3,
                                   spare2, spare1}
PollPDU ::=                    ENUMERATED {
                                   p4, p8, p16, p32, p64, p128, p256, p512, p1024, p2048
p4096, p6144, p8192, p12288, p16384, p20480, p24576, p28672, p32768, p40960, p49152, p57344, p65536,
infinity, spare8, spare7, spare6, spare5, spare4, spare3, spare2, spare1}
PollByte ::=                   ENUMERATED {
                                   kB1, kB2, kB5, kB8, kB10, kB15, kB25, kB50, kB75,
                                   kB100, kB125, kB250, kB375, kB500, kB750, kB1000,
                                   kB1250, kB1500, kB2000, kB3000, kB4000, kB4500,
                                   kB5000, kB5500, kB6000, kB6500, kB7000, kB7500,
                                   mB8, mB9, mB10, mB11, mB12, mB13, mB14, mB15,
                                   mB16, mB17, mB18, mB20, mB25, mB30, mB40, infinity,
                                   spare20, spare19, spare18, spare17, spare16,
                                   spare15, spare14, spare13, spare12, spare11,
                                   spare10, spare9, spare8, spare7, spare6, spare5,
                                   spare4, spare3, spare2, spare1}
T-Reassembly ::=               ENUMERATED {
                                   ms0, ms5, ms10, ms15, ms20, ms25, ms30, ms35,
                                   ms40, ms45, ms50, ms55, ms60, ms65, ms70,
                                   ms75, ms80, ms85, ms90, ms95, ms100, ms110,
                                   ms120, ms130, ms140, ms150, ms160, ms170,
                                   ms180, ms190, ms200, spare1}
T-StatusProhibit ::=           ENUMERATED {
                                   ms0, ms5, ms10, ms15, ms20, ms25, ms30, ms35,
                                   ms40, ms45, ms50, ms55, ms60, ms65, ms70,
                                   ms75, ms80, ms85, ms90, ms95, ms100, ms105,
                                   ms110, ms115, ms120, ms125, ms130, ms135,
                                   ms140, ms145, ms150, ms155, ms160, ms165,
                                   ms170, ms175, ms180, ms185, ms190, ms195,
                                   ms200, ms205, ms210, ms215, ms220, ms225,
                                   ms230, ms235, ms240, ms245, ms250, ms300,
                                   ms350, ms400, ms450, ms500, ms800, ms1000,
                                   ms1200, ms1600, ms2000, ms2400, spare2, spare1}
SN-FieldLengthAM ::=           ENUMERATED {size12, size18}
```

If the base station selects RLC UM mode, an embodiment of RLC configuration information is as follows.

```
SL RLC-BearerConfig ::=        SEQUENCE {
    logicalChannelIdentity         LogicalChannelIdentity,
    servedRadioBearer              SLRB-Identity
    SL_rlc-Config                  SL_RLC-Config
    mac-LogicalChannelConfig       LogicalChannelConfig
}
SL_RLC-Config ::=              CHOICE {
    am                             SL-AM-RLC
    um                             SL-UM-RLC
}
```

In another embodiment, if the base station selects RLC UM mode, the base station may transmit, to the terminals 120 and 130, an RRC configuration message in which separate RLC configuration information is not configured. The case described above can be applied if the system is designed such that sidelink RLC UM configuration information has already been configured for the terminals 120 and 130. If the base station selects RLC UM mode, the base station may transmit packet transmission/reception resource information for RLC The base station may transmit an RRC configuration message including the sidelink RLC configuration information to the terminal 120 in response to the UE assistance information message. (4) The base station may transmit an RRC configuration message including the sidelink RLC configuration information to the terminal 130 in response to the UE assistance information message.

In another embodiment, an RRC configuration message transmitted by the base station to the terminals 120 and 130 may include transmission resource information for sidelink RLC AM mode.

The base station may provide sidelink resources for data packet transmission and sidelink resources for ARQ feedback transmission. Mode 1 indicates that the base station schedules sidelink resources. Mode 2 indicates that the terminal selects sidelink resources. In the case of mode 1, sidelink resources for data packet transmission may be allocated in a semi persistence scheduling (SPS) scheme or a configured grant type scheme. In the case of mode 1, sidelink resources for ARQ feedback transmission may be allocated in a SPS scheme or a configured grant type scheme.

The following description relates to an embodiment of transmission resource information of sidelink RLC AM mode.

- Allocate resources for transmitting a data packet in a mode 1 and SPS scheme
- Allocate ARQ feedback transmission resources in a mode 1 and SPS scheme (The SPS period of the ARQ feedback resources may be determined to be the same as or similar to the period of an ARQ feedback poll.)

The following description relates to another embodiment of transmission resource information of sidelink RLC AM mode.

Allocate resources for transmitting a data packet in a mode 1 and SPS scheme
  Allocate ARQ feedback transmission resources in a mode 1 and SPS scheme
  (The SPS period of the ARQ feedback resources may be determined to be the same as or similar to the period of an ARQ feedback poll.)
  If a reception node should transmit ARQ feedback by itself, instruct the reception node to execute a sidelink buffer status report (SL BSR)

The following description relates to another embodiment of transmission resource information of sidelink RLC AM mode.

Allocate resources for transmitting a data packet in a mode 1 and SPS scheme
  Allocate ARQ feedback transmission resources in a mode 1 and SPS scheme
  (The SPS period of the ARQ feedback resources may be determined to be the same as or similar to the period of an ARQ feedback poll.)
  If a reception node should transmit ARQ feedback by itself, allocate resources in a mode 2 scheme The following description relates to another embodiment of transmission resource information of sidelink RLC AM mode.

Allocate resources for transmitting a data packet in a mode 1 and SPS scheme
  Allocate (obtain based on sensing) ARQ feedback transmission resources in a mode 2 scheme (even if a reception node should transmit ARQ feedback by itself)

The following description relates to another embodiment of transmission resource information of sidelink RLC AM mode.

Allocate resources for transmitting a data packet in a mode 2 scheme
  Allocate ARQ feedback transmission resources in a mode 2 scheme (even if a reception node should transmit ARQ feedback by itself)

In another embodiment relating to transmission resource information of sidelink RLC AM mode, a dynamic resource allocation scheme which employs a mode 1 scheme but is based on a SL BSR may be operated.

Figure 7C:
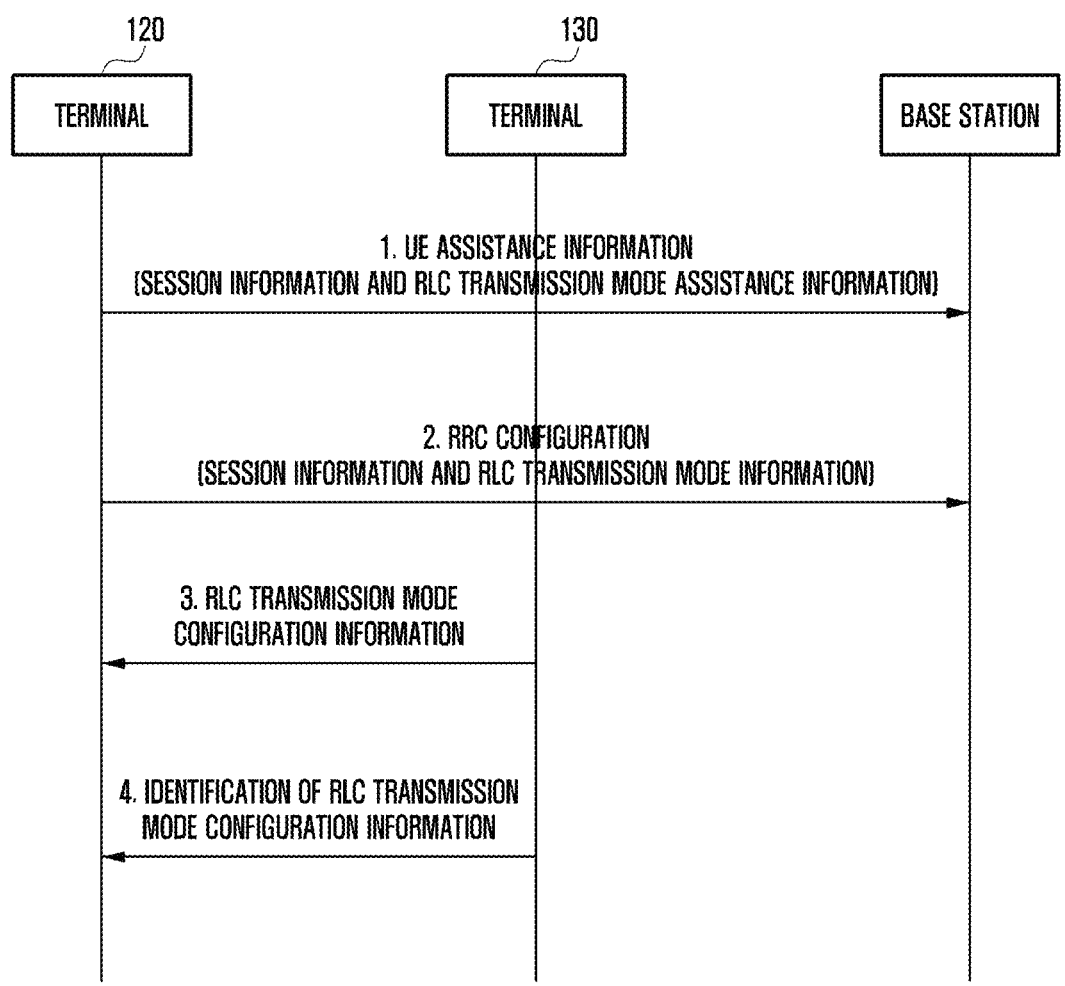

FIG. 7C illustrates an embodiment of obtaining RLC transmission mode configuration information for a unicast session if it is determined that the terminal 120 having obtained unicast session information according to the embodiment illustrated in FIG. 6 is located in the coverage of a base station and the terminal 130 is not located in the coverage of a base station. An embodiment indicated by the number (7-3) is made under an assumption that it is determined that the terminal 120 is located in the coverage of a base station and the terminal 130 is not located in the coverage of a base station. The terminals 120 and 130 may exchange information relating to whether they are in a base station coverage, during a unicast session configuration procedure. If a terminal is located in the coverage of a base station, the terminal may transfer base station identifier information. Base station identifier information may include at least one of a base station ID, a cell ID, cell frequency band information, and BWP information. According to the embodiment indicated by the number (7-3), the terminal 120 may determine that the terminal 130 is not located in a base station coverage. In an embodiment, the terminal 120 may transfer, to the base station and through a UE assistance information message, instruction information requesting RLC configuration information for a unicast session with the terminal 130 which is not located in a base station coverage. In another embodiment, the base station may manage a timer for processing an RLC configuration information request for an identical unicast session. If the base station which has received a UE assistance information message requesting RLC configuration information for a unicast session from the terminal 120 starts the timer and fails to receive a message requesting RLC configuration information for the same unicast session from the terminal 130 until the timer is expired, the base station may recognize that the terminal 130 is not located in a base station coverage. The message requesting RLC configuration information for the same unicast session from the terminal 130 may correspond to a UE assistance information message which is received directly from the terminal 130, or a message which is received from an adjacent base station, which is a serving base station of the terminal 130.

(1) The terminal 120 may transmit a UE assistance information message to the base station. The UE assistance information message may include a base station identifier, RLC transmission mode assistance information, an out-of-coverage indicator, and unicast session information, for example, at least one information among a session identifier, a destination identifier, a source identifier, and a transmission type. According to an embodiment, the base station identifier may correspond to at least one of a base station ID, a cell ID, cell frequency band information, and bandwidth part (BWP) information. The out-of-coverage indicator corresponds to information indicating that the terminal 130 having configured a unicast session with the terminal 120 fails to be in a base station coverage. (2) If the base station receives UE assistance information messages including RLC transmission mode assistance information or unicast session information of the terminals 120 and 130 and the messages include a base station identifier, the base station may determine that RLC information configuration for unicast transmission with a terminal located in the coverage of an adjacent base station is required. If the UE assistance information messages do not include a base station identifier, the base station may determine that RLC information configuration for unicast transmission with a terminal located in the coverage of the same base station is required. If the messages include an out-of-coverage indicator, the base station may determine that a unicast session with a terminal which is not located in a base station coverage has been configured. The base station may determine a sidelink unicast RLC transmission mode for the terminals 120 and 130. The base station may select one of RLC AM mode (acknowledge mode) or RLC UM mode (unacknowledged mode) as an RLC transmission mode. The base station may configure sidelink RLC configuration information according to a selected RLC transmission mode. Sidelink RLC configuration information of the case of selecting RLC AM mode or sidelink RLC configuration information of the case of selecting RLC UM mode has been already described above in section (7-2). The base station may transmit the sidelink RLC configuration information for each RLC transmission mode to the terminal 120. The base station may provide sidelink resources for data packet transmission and sidelink resources for ARQ feedback transmission. (3) The terminal 120 may receive sidelink RLC configuration information from the base station and transfer the obtained information to the terminal 130. (4) The terminal 130 may obtain sidelink RLC configuration information from the terminal 120. The sidelink RLC configuration information exchanged between the two terminals in the operations indicated by the numbers (3) and (4) is sidelink RLC configuration information of the operation indicated by the number (2), and is configuration information to be applied if an RLC transmission mode is RLC AM or RLC UM. The information exchanged in the operations indicated by the numbers (3) and (4) may include allocation information relating to sidelink resources for data packet transmission and sidelink resources for ARQ feedback transmission.

Figure 7D:
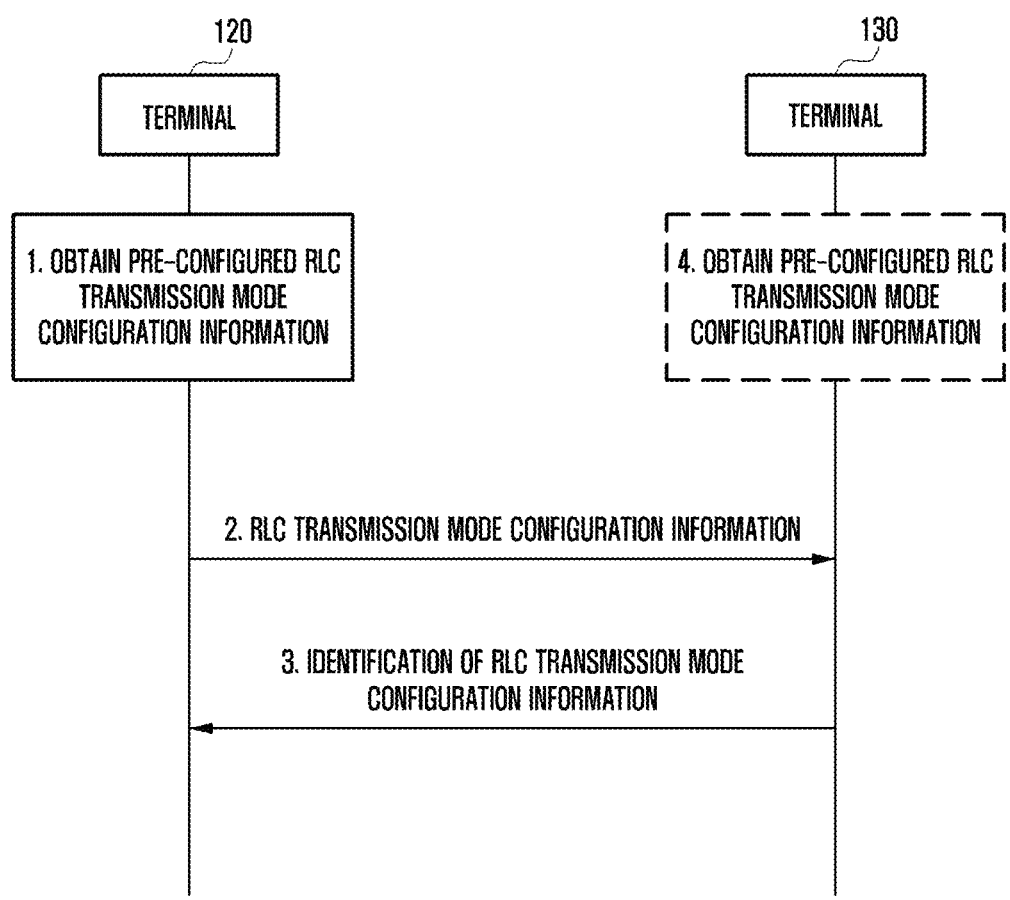

FIG. 7D illustrates an embodiment of configuring an RLC transmission mode for a unicast session if it is determined that the terminals 120 and 130 having obtained unicast session information according to the embodiment illustrated in FIG. 6 are not located in a base station coverage.

FIG. 7D illustrates a case in which it is determined that the terminals 120 and 130 are not located in a base station coverage. The terminals 120 and 130 may exchange information relating to whether the terminals 120 and 130 are located in a base station coverage, during a unicast session configuration procedure. If it is not determined that the terminals 120 and 130 are located in a base station coverage, one terminal among the two terminals may start a procedure of configuring an RLC transmission mode according to an embodiment. For example, a terminal having started a unicast session procedure may start a procedure of configuring an RLC transmission mode. In another example, a terminal of a leader vehicle of group driving may start a procedure of configuring an RLC transmission mode. (1) The terminal 120 may obtain RLC configuration information pre-configured to be used in an out-of-coverage situation. The terminal 120 may determine an RLC transmission mode (RLC AM or RLC UM) according to V2X service information or session information obtained during a unicast session configuration procedure and determine RLC configuration according to a determined transmission mode. For example, according to pre-configured information, if a V2X service to be performed by the two terminals is configured to use RLC AM transmission mode, the two terminals may decide to use RLC AM transmission mode and RLC AM configuration information. (2) The terminal 120 may transfer, to the terminal 130, RLC configuration information determined in the operation indicated by the number (1). (3) The terminal 130 may identify RLC configuration received from the terminal 120 and then transfer a response message relating to the determined RLC configuration. The information exchanged in the operations indicated by the numbers (2) and (3) may include allocation information relating to sidelink resources for data packet transmission and sidelink resources for ARQ feedback transmission.

According to another embodiment, if configuration information which the two terminals are to apply to the RLC transmission mode of the unicast session can be obtained from pre-configuration, the information exchanged by the two terminals in the operations indicated by the numbers (2) and (3) may be simple. For example, a specific RLC configuration parameter set for each RLC transmission mode may be obtained from pre-configured configuration, and the messages from the operations indicated by the numbers (2) and (3) may include configuration index information indicating a corresponding parameter set to be used by the two terminals. Allocation information relating to sidelink resources for data packet transmission and sidelink resources for ARQ feedback transmission may be also obtained from pre-configured configuration, and index information indicating which configuration the two terminals is to use may be indicated by the pre-configured configuration.

According to another embodiment, the two terminals may start a procedure of configuring an RLC transmission mode independently. In this case, the two terminals may obtain pre-configured RLC configuration information in advance, wherein pre-configured RLC configuration includes defined mapping information indicating which RLC configuration is to be configured according to V2X service information or session information obtained during a unicast session configuration procedure of the two terminals, or indicating which RLC transmission mode (RLC AM or RLC UM) is to be selected according to the V2X information and session information, and sidelink RLC configuration information of a selected RLC transmission mode is obtained through the pre-configured RLC configuration. For example, if it is determined in an application layer of a terminal that a group driving service is to be performed, a V2X profile for supporting the group driving service may instruct use of RLC AM transmission mode. In addition, the V2X profile may indicate an RLC AM configuration parameter set mapped to RLC AM mode. Allocation information relating to sidelink resources for data packet transmission and sidelink resources for ARQ feedback transmission may be also indicated by pre-configured configuration.

Figure 7E:
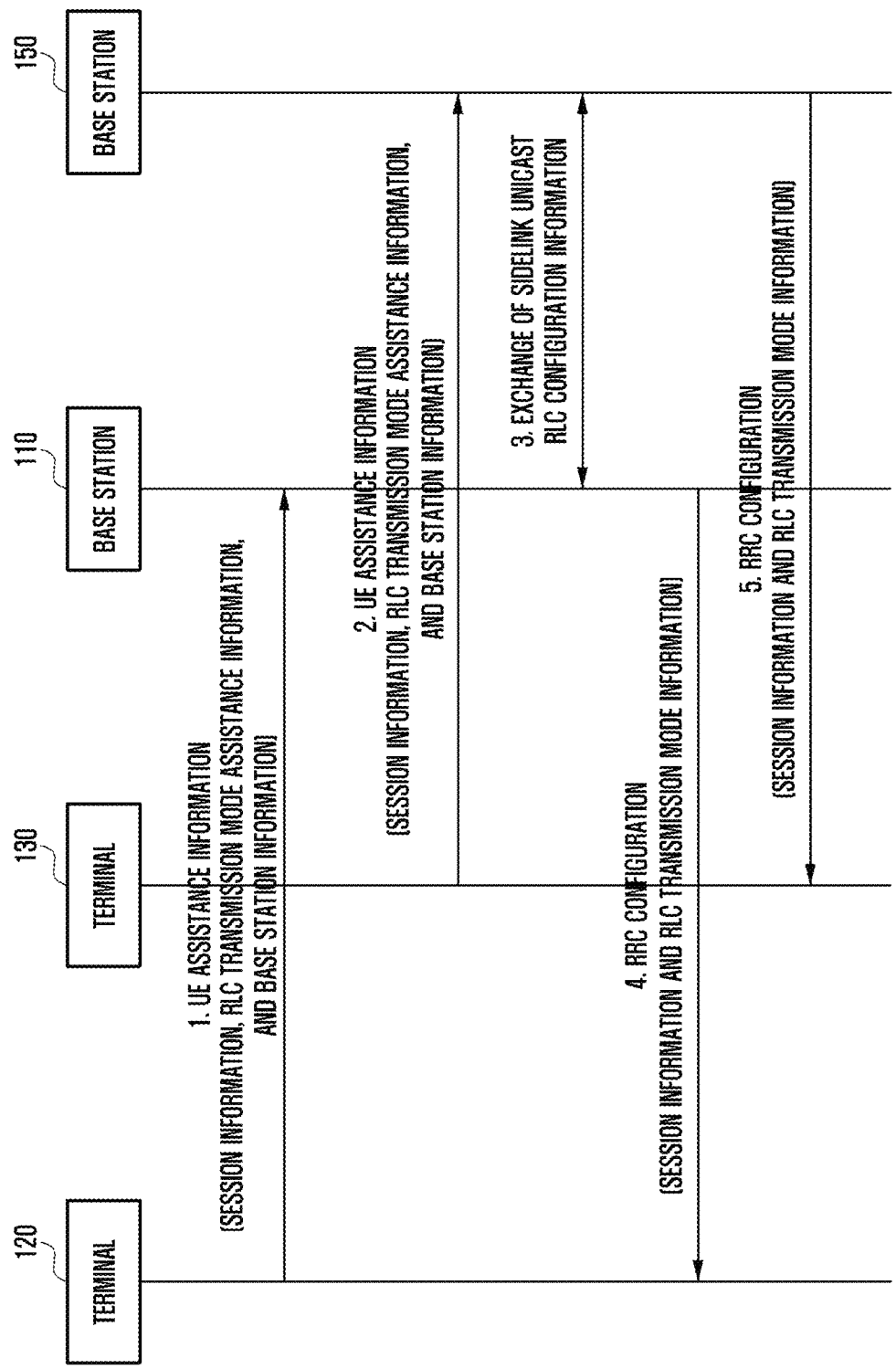

FIG. 7E illustrates an embodiment of obtaining RLC transmission mode configuration information for a unicast session if it is determined that the terminal 120 having obtained unicast session information according to the embodiment illustrated in FIG. 6 is located in the coverage of a base station 110 and the terminal 130 is located in the coverage of the base station 150. FIG. 7E illustrates an embodiment of configuring a sidelink unicast session for a V2X service between the two terminals located in the coverages of different base stations and obtaining an RLC transmission mode and RLC configuration information to be used for sidelink unicast. In the embodiment, a terminal may transmit a UE assistance information message requesting configuration of an RLC transmission mode to a serving base station, the message including information of a base station of an opposite terminal, so as to allow sidelink unicast RLC transmission mode configuration information to be exchanged between the base stations. (1) The terminal 120 may transmit a UE assistance information message to the base station 110. The UE assistance information message may include a base station identifier, RLC transmission mode assistance information, and unicast session information, for example, at least one information among a session identifier, a destination identifier, a source identifier, and a transmission type. According to an embodiment, the base station identifier may correspond to at least one of a base station ID, a cell ID, cell frequency band information, and bandwidth part (BWP) information. (2) The terminal 130 may transmit a UE assistance information message to the base station 150. The UE assistance information message may include a base station identifier, RLC transmission mode assistance information, and unicast session information, for example, at least one information among a session identifier, a destination identifier, a source identifier, and a transmission type. (3) The base stations 110 and 150 having received UE assistance information messages including session information or RLC transmission mode assistance information from the terminals 120 and 130 may identify opposite base station information from pieces of base station identifier information included in the UE assistance information messages. The base stations 110 and 150 may determine that RLC information configuration for sidelink unicast transmission between the terminals 120 and 130 is required, and may determine an RLC transmission mode and RLC configuration information after consultation with each other. The base stations 110 and 150 may determine that the two terminals will perform a sidelink unicast transmission, through session information, that is, an identical session identifier, an identical destination identifier, an identical source identifier, and a transmission type. The base stations 110 and 150 may determine a sidelink unicast RLC transmission mode of the terminals 120 and 130. The base stations 110 and 150 may configure sidelink RLC configuration information for selected RLC transmission modes. The base stations 110 and 150 may exchange unicast sidelink transmission resource information (packet transmission resources, ARQ feedback transmission resources, etc.) according to RLC transmission modes. (4) The base station 110 may transfer, to the terminal 120, an RRC configuration message including an RLC transmission mode and RLC configuration information which is determined in the operation indicated by the number (3) and is to be used for sidelink unicast. (5) The base station 150 may transfer, to the terminal 130, an RRC configuration message including an RLC transmission mode and RLC configuration information which is determined in the operation indicated by the number (3) and is to be used for sidelink unicast. The RRC configuration messages from the operations indicated by the numbers (4) and (5) may also include unicast sidelink transmission resource information.

Figure 7F:
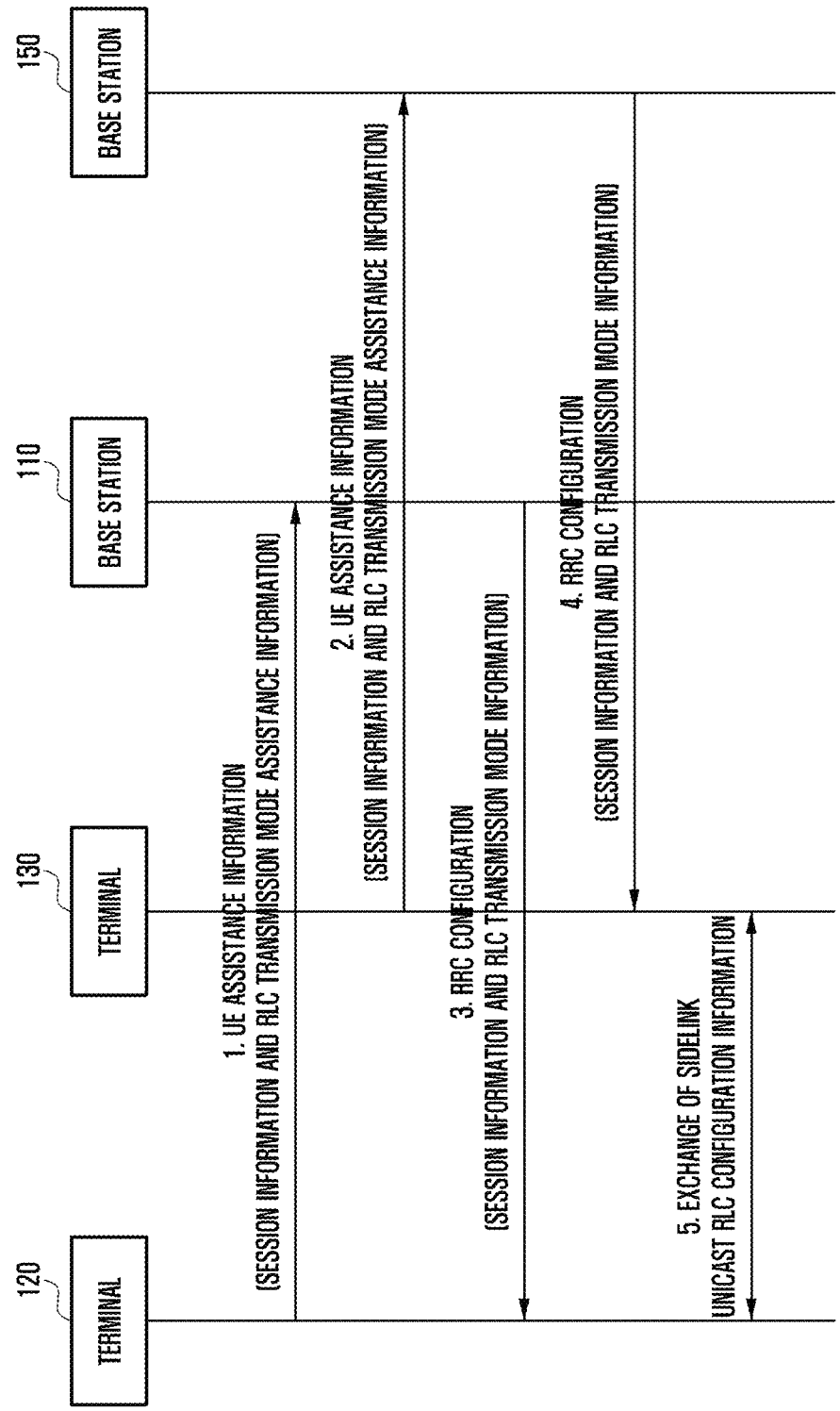

FIG. 7F illustrates another embodiment of obtaining RLC transmission mode configuration information for a unicast session if it is determined that the terminal 120 having obtained unicast session information according to the embodiment illustrated in FIG. 6 is located in the coverage of a base station 110 and the terminal 130 is located in the coverage of the base station 150. FIG. 7F illustrates an embodiment of configuring a sidelink unicast session for a V2X service between the two terminals located in the coverages of different base stations and obtaining an RLC transmission mode and RLC configuration information to be used for sidelink unicast. In the embodiment, each of the terminals may transmit a UE assistance information message requesting configuration of an RLC transmission mode to its own serving base station, obtain sidelink unicast RLC transmission mode configuration information from the its own serving base station, and then exchange the sidelink unicast RLC transmission mode configuration information obtained by the terminal itself with the other terminal. (1) The terminal 120 may transmit a UE assistance information message to the base station 110. The UE assistance information message may include a base station identifier, RLC transmission mode assistance information, and unicast session information, for example, at least one information among a session identifier, a destination identifier, a source identifier, and a transmission type. According to an embodiment, the base station identifier may correspond to at least one of a base station ID, a cell ID, cell frequency band information, and bandwidth part (BWP) information. (2) The terminal 130 may transmit a UE assistance information message to the base station 150. The UE assistance information message may include a base station identifier, RLC transmission mode assistance information, and unicast session information, for example, at least one information among a session identifier, a destination identifier, a source identifier, and a transmission type. (3) The base station 110 may determine a sidelink unicast RLC transmission mode according to the UE assistance information message of terminal 120 and may transmit an RRC configuration including configuration information according to the RLC transmission mode and transmission resource information (packet transmission resource, ARQ feedback transmission resource, etc.) according to the RLC transmission mode. (4) The base station 150 may determine a sidelink unicast RLC transmission mode according to the UE assistance information message of terminal 130 and may transmit an RRC configuration including configuration information according to the RLC transmission mode and transmission resource information (packet transmission resource, ARQ feedback transmission resource, etc.) according to the RLC transmission mode. (5) The terminals 120 and 130 may exchange an RLC transmission mode, RLC configuration information, and transmission resource information which are received from the operations indicated by the numbers (3) and (4) and are to be used for sidelink unicast. The operation indicated by the number (5) may be performed when the terminals 120 and 130 should apply the same parameter set according to an RLC transmission mode used for sidelink unicast by the terminals 120 and 130, or may be performed for configuring a parameter set required for matching synch (e.g. ARQ feedback poll period) of an RLC transmission mode operation.

The above description is made according to an example in which a terminal which is to obtain RLC configuration information for sidelink unicast transmission transmits a UE assistance information message to a base station. However, the message transmitted to obtain the information by the terminal to the base station may be a random RRC message.

In an embodiment, a UE assistance information message transmitted by the terminal 120 or 130 to the corresponding base station may include an indicator indicating a transmission terminal. In another embodiment, a UE assistance information message transmitted by the terminal 120 or 130 to the corresponding base station may include an indicator indicating a reception terminal.

In an embodiment, if the terminal 120 or 130 is a transmission terminal, configuration information message obtained from a corresponding base station may include at least one of sidelink transmission resource information, sidelink RLC configuration information for transmission, and sidelink RLC configuration information which the transmission terminal and a reception terminal should share. If the terminal 120 or 130 is a reception terminal, a configuration information message obtained from a corresponding base station may include at least one of sidelink transmission resource information and sidelink RLC configuration information for reception.

In an embodiment, a transmission terminal may transmit, to a reception terminal, at least one of sidelink RLC configuration information which the transmission terminal and the reception terminal should share, and sidelink transmission resource information, among pieces of configuration information obtained from a base station.

In an embodiment, a reception terminal may transmit, to a transmission terminal, at least one of sidelink transmission resource information, sidelink RLC configuration information which the transmission terminal and the reception terminal should share, and ARQ feedback transmission resource information, among pieces of configuration information obtained from a base station.

In an embodiment, a transmission terminal may transmit, to a reception terminal, at least one of sidelink RLC configuration information which the transmission terminal and the reception terminal should share, and sidelink transmission resource information, among pieces of pre-allocated configuration information.

In an embodiment, a reception terminal may transmit, to a transmission terminal, at least one of sidelink RLC configuration information which the transmission terminal and the reception terminal should share, sidelink transmission resource information, and ARQ feedback transmission resource information, among pieces of pre-allocated configuration information.

In an embodiment, a reception terminal may transmit, to a transmission terminal, at least one of sidelink RLC configuration information which the transmission terminal and the reception terminal should share, sidelink transmission resource information, and ARQ feedback transmission resource information, among pieces of random terminal configuration information.

Figure 8:
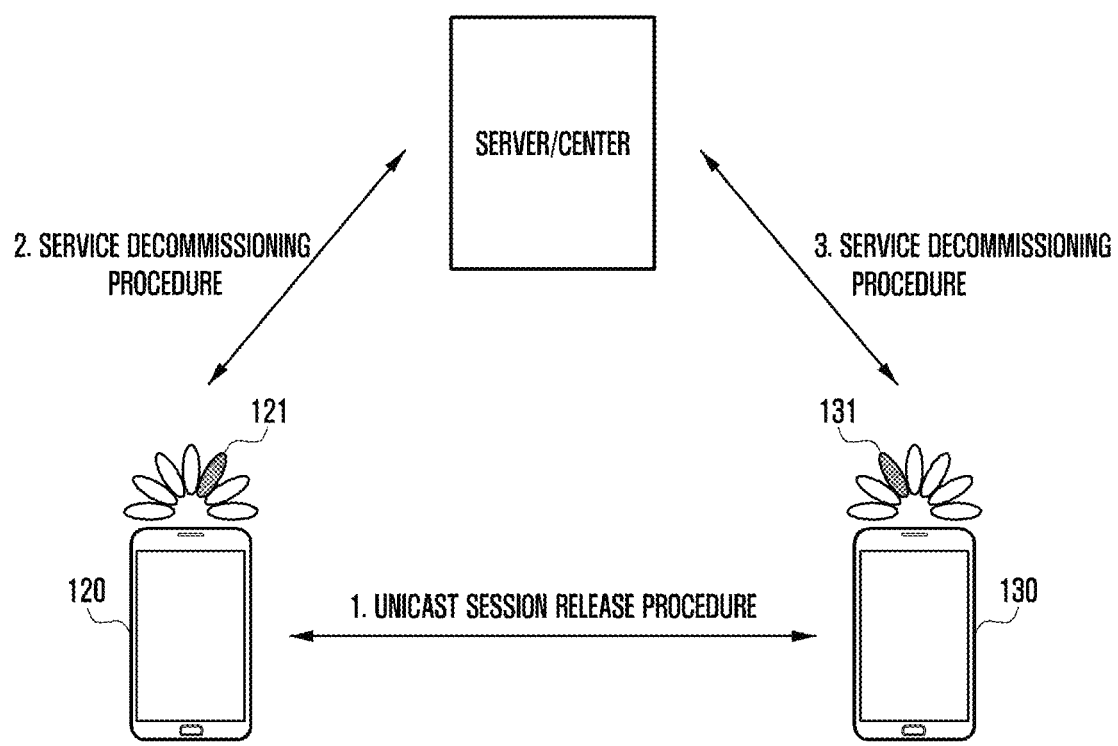
FIG. 8 illustrates releasing a session for unicast transmission between terminals according to various embodiments.

FIG. 8 illustrates releasing a session for unicast transmission between terminals according to various embodiments.

Referring to FIG. 8, if a V2X service through a unicast session is terminated, the terminals 120 and 130 may perform a unicast session release procedure. The terminals 120 and 130 may perform an RLC transmission mode release procedure. (1) In an embodiment, the two terminals may perform an RLC transmission mode release procedure during a unicast session release procedure. (1) In another embodiment, the two terminals may perform a unicast session release procedure after an RLC transmission mode release procedure.

In the case where the two terminals decide to perform an RLC transmission mode release procedure, according to an embodiment, if an RLC transmission mode is configured to RLC AM and the terminals 120 and 130 are determined to be in a base station coverage, the terminals 120 and 130 may transmit an RLC AM configuration release assistance message to their own serving base stations and perform an RLC transmission mode release procedure between the two terminals. The RLC AM configuration release assistance message may include at least one of a sidelink radio bearer identifier and session information. According to another embodiment, if an RLC transmission mode is configured to RLC AM and it is determined that the terminals 120 and 130 are not located in a base station coverage, only an RLC transmission mode release procedure between the two terminals may be performed. According to another embodiment, if an RLC transmission mode is configured to RLC AM and it is determined that one terminal among the two terminals is located in a base station coverage, the corresponding terminal may transmit an RLC AM configuration release assistance message to its own serving base station and perform an RLC transmission mode release procedure between the two terminals. In the above description, an example in which an RLC transmission mode is configured to RLC AM is explained, but even if RLC UM configuration information is received from a base station, an RLC UM configuration release assistance message may be transmitted to the serving base station to release RLC UM configuration information.

(2) After a unicast session release procedure is performed, the terminal 120 may perform a V2X service decommissioning procedure through a V2X server or a V2X center. (3) After a unicast session release procedure is performed, the terminal 130 may perform a V2X service decommissioning procedure through the V2X server or the V2X center.

A detailed method for a case where a terminal located in a base station coverage transmits RLC transmission mode release assistance configuration information notifying a corresponding base station of unicast session release may include at least one of the following embodiments. RLC transmission mode release assistance configuration information may be processed during a hand-over procedure of a terminal. RLC transmission mode release assistance configuration information may be processed at a time point where it is determined that the terminal is not located in a base station coverage. RLC transmission mode release assistance configuration information may be processed during a process in which the terminal transitions to an RRC IDLE state or an RRC INACTIVE state.

Figure 9:
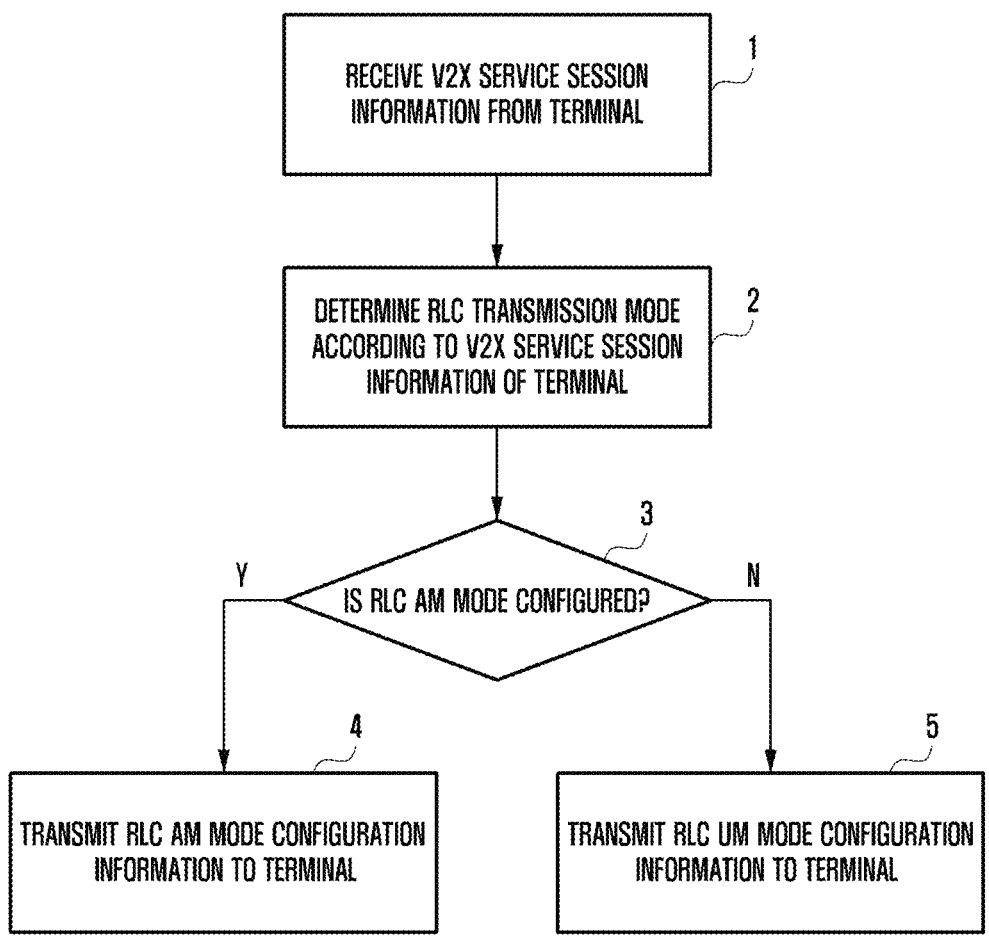
FIG. 9 illustrates an operation of a base station for unicast transmission between terminals according to various embodiments.

FIG. 9 illustrates an operation of a base station for unicast transmission between terminals according to various embodiments. Referring to FIG. 9, (1) a base station may receive a UE assistance information message from a terminal. The UE assistance information message may include V2X service session information of the terminal. The V2X service session information may include at least one of sidelink unicast session information, transmission type information, service QoS information, a service identifier, an application identifier, a destination identifier, a source identifier, preferred RLC transmission mode of the terminal, and a base station identifier according to an embodiment. (2) The base station may determine a sidelink unicast RLC transmission mode (RLC AM mode or RLC UM mode) on the basis of the V2X service session information. As an operation of determining an RLC transmission mode by the base station, the base station operations explained in FIG. 7 may be applied. (3) If a sidelink unicast RLC transmission mode is determined to RLC AM according to a determination in the operation indicated by the number (2), the base station may perform an operation indicated by the number (4) to transmit an RRC configuration message including configuration information of the sidelink unicast RLC AM mode to the terminal. The RRC configuration message may include information relating to ARQ feedback transmission resources and packet transmission resources of RLC AM. If a sidelink unicast RLC transmission mode is determined to RLC UM according to a determination in the operation indicated by the number (2), the base station may perform an operation indicated by the number (5) to transmit an RRC configuration message including configuration information of the sidelink unicast RLC UM mode to the terminal. The RRC configuration message may include packet transmission resource information of RLC UM.

According to an embodiment, a UE assistance information message which a base station can receive from a terminal may include at least one of indication information indicating that the terminal is a reception terminal and indication information indicating that the terminal is a transmission terminal.

According to an embodiment, if the terminal is determined to a reception terminal, the base station may transfer, to the terminal, at least one of sidelink transmission resource information, sidelink RLC configuration information for reception, and ARQ feedback transmission resource information.

According to an embodiment, if the terminal is determined to a transmission terminal, the base station may transfer, to the terminal, at least one of sidelink transmission resource information, sidelink RLC configuration information for transmission, and sidelink RLC configuration information which should be shared by the transmission terminal and a reception terminal.

Figure 10:
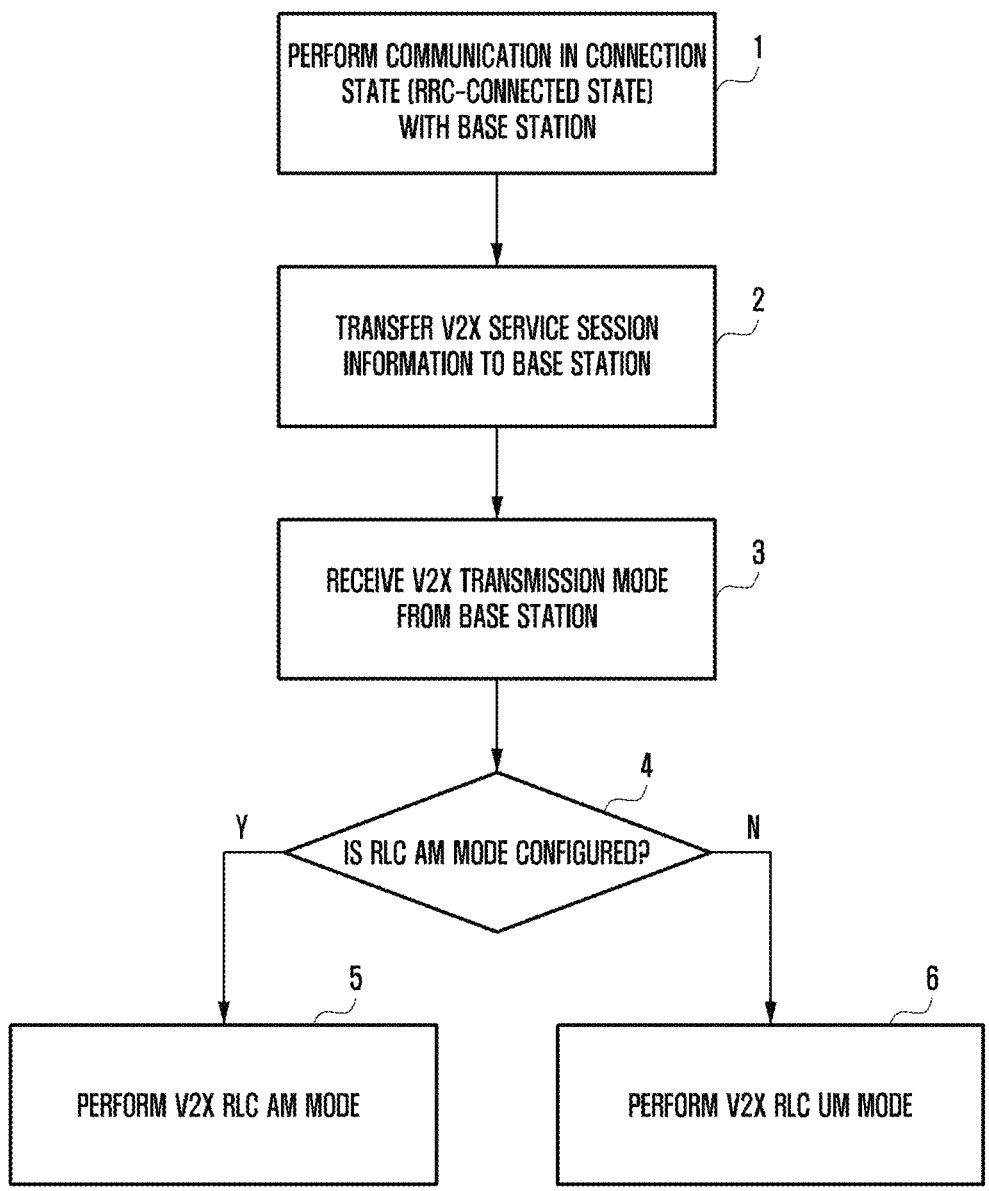
FIG. 10 illustrates an operation of a terminal which is in an RRC-connected state, the operation being performed for terminal-to-terminal unicast transmission according to various embodiments.

FIG. 10 illustrates an operation of a terminal which is in an RRC-connected state, the operation being performed for terminal-to-terminal unicast transmission according to various embodiments. Referring to FIG. 10, (1) a terminal may transmit a UE assistance information message including V2X service session information in an operation indicated by the number (2) to request, from a base station, an RLC transmission mode and configuration information required for sidelink unicast transmission/reception, while the terminal performs communication in an RRC-connected state with the base station. The V2X service session information transmitted to the base station in the operation indicated by the number (2) may include at least one of a session identifier, transmission type information, service QoS information, a service identifier, an application identifier, a destination identifier, a source identifier, preferred RLC transmission mode of the terminal, and a base station identifier according to an embodiment. (3) If the terminal can receive an RRC configuration message from the base station, the RRC configuration message may include an RLC transmission mode and RLC configuration information which are to be used to perform sidelink unicast transmission/reception by the terminal. The RRC configuration message may include sidelink unicast transmission resource information according to an RLC transmission mode. (4) The terminal may determine whether information relating to the RLC transmission mode received in the operation indicated by the number (3) indicates RLC AM. If RLC AM mode information is included according to a determination of the operation indicated by the number (4), the terminal may perform an operation indicated by the number (5) to perform sidelink unicast transmission/reception by using the RLC AM mode information. If the RLC AM mode information is not included according to a determination of the operation indicated by the number (4), the terminal may perform an operation indicated by the number (6) to perform sidelink unicast transmission/reception by using RLC UM mode information.

According to an embodiment, a UE assistance information message transmitted by a terminal to a base station may include at least one of indication information indicating that the terminal is a transmission terminal and indication information indicating that the terminal is a reception terminal.

According to an embodiment, a transmission terminal may obtain, through an RRC configuration message transmitted by a base station, at least one of sidelink unicast resource information according to an RLC transmission mode, configuration information for transmission according to the RLC transmission mode, and configuration information required to be shared by the transmission terminal and a reception terminal according to the RLC transmission mode.

According to an embodiment, a reception terminal may obtain, through an RRC configuration message transmitted by a base station, at least one of sidelink unicast resource information according to an RLC transmission mode, configuration information for reception according to the RLC transmission mode, ARQ feedback configuration information, and ARQ feedback resource information.

Figure 11:
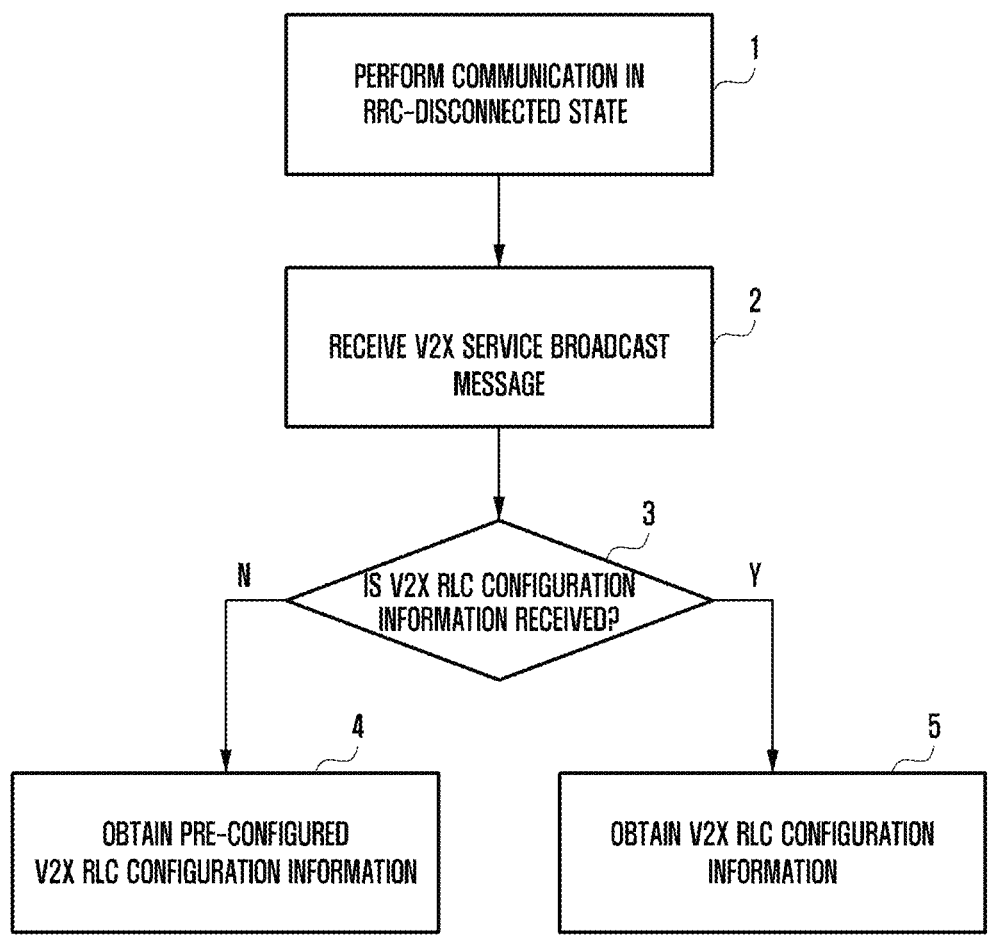
FIG. 11 illustrates an operation of a terminal which is in an RRC-disconnected state, the operation being performed for terminal-to-terminal unicast transmission according to various embodiments.

FIG. 11 illustrates an operation of a terminal which is in an RRC-disconnected state, the operation being performed for terminal-to-terminal unicast transmission according to various embodiments. Referring to FIG. 11, (1) a terminal may require an RLC transmission mode and configuration information for sidelink unicast transmission/reception while the terminal performs communication in an RRC-disconnected state (RRC-idle stat or RRC-inactive state) with a base station. (2) If the terminal receives a V2X service broadcast message (SIB) transmitted by the base station, (3) the terminal may determine whether the V2X service broadcast message includes RLC configuration information for sidelink unicast. The RLC configuration information for sidelink unicast included in the V2X service broadcast message in the operation indicated by the number (3) may include at least one of RLC transmission mode mapping information for each V2X service, configuration information of RLC transmission mode AM, and configuration information of RLC transmission mode UM according to an embodiment. The RLC transmission mode mapping information for each V2X service may correspond to an RLC transmission mode (RLC AM or RLC UM) indicator mapped to a transmission type (unicast, groupcast, and broadcast). The RLC transmission mode mapping information for each V2X service may correspond to an RLC transmission mode indicator mapped to a V2X service profile. If the terminal obtains RLC configuration information for sidelink unicast transmission/reception through the V2X service broadcast message according to a determination in the operation indicated by the number (3), the terminal may perform a sidelink unicast operation in an operation indicated by the number (5) by using the received RLC transmission mode and RLC configuration information. If the terminal fails to obtain RLC configuration information for sidelink unicast transmission/reception through the V2X service broadcast message according to a determination in the operation indicated by the number (3), the terminal may perform a sidelink unicast operation in an operation indicated by the number (4) by using pre-configured RLC configuration information. The pre-configured RLC configuration information may include at least one of an RLC transmission mode mapped to a transmission type (unicast, groupcast, and broadcast), an RLC transmission mode mapped to a V2X service identifier, an RLC transmission mode mapped to a V2X application identifier, an RLC transmission mode mapped to a V2X destination identifier, an RLC transmission mode mapped to a V2X source identifier, configuration information of RLC AM, configuration information of RLC UM, packet transmission/reception resource information of RLC AM, ARQ feedback transmission/reception resource information of RLC AM, and packet transmission/reception resource information of RLC UM.

According to an embodiment, a transmission terminal may obtain, through a V2X service broadcast message transmitted by a base station, at least one of sidelink unicast resource information according to an RLC transmission mode, configuration information for transmission according to the RLC transmission mode, and configuration information required to be shared by the transmission terminal and a reception terminal according to the RLC transmission mode.

According to an embodiment, a reception terminal may obtain, through a V2X service broadcast message transmitted by a base station, at least one of sidelink unicast resource information according to an RLC transmission mode, configuration information for reception according to the RLC transmission mode, ARQ feedback configuration information, and ARQ feedback resource information.

According to an embodiment, a transmission terminal may obtain, through pre-configured RLC configuration information, at least one of sidelink unicast resource information according to an RLC transmission mode, configuration information for transmission according to the RLC transmission mode, and configuration information required to be shared by the transmission terminal and a reception terminal according to the RLC transmission mode.

According to an embodiment, a reception terminal may obtain, through pre-configured RLC configuration information, at least one of sidelink unicast resource information according to an RLC transmission mode, configuration information for reception according to the RLC transmission mode, ARQ feedback configuration information, and ARQ feedback resource information.

According to an embodiment, a reception terminal may obtain at least one of sidelink unicast resource information according to an RLC transmission mode randomly configured by the terminal, configuration information for reception according to the RLC transmission mode, ARQ feedback configuration information, and ARQ feedback resource information.

According to an embodiment, a transmission terminal performing sidelink unicast transmission or reception of a packet may transfer, to a reception terminal, at least one of sidelink unicast resource information according to an RLC transmission mode and configuration information required to be shared by the transmission terminal and a reception terminal according to the RLC transmission mode, which are obtained through a V2X service broadcast message transmitted by a base station or obtained through pre-configured RLC configuration information.

According to an embodiment, a reception terminal performing sidelink unicast transmission or reception of a packet may transfer, to a transmission terminal, at least one of sidelink unicast resource information according to an RLC transmission mode, configuration information required to be shared by the transmission terminal and the reception terminal according to the RLC transmission mode, ARQ feedback configuration information, and ARQ feedback resource information, which are obtained through a V2X service broadcast message transmitted by a base station or obtained through pre-configured RLC configuration information.

A V2X service broadcast message transmitted by a base station supporting a V2X service may include at least one of an RLC transmission mode indicator for each transmission type (unicast, groupcast, and broadcast), an RLC transmission mode indicator mapped to a V2X service profile, configuration information of RLC AM, configuration information of RLC UM, packet transmission/reception resource information of the case where RLC AM is configured, ARQ feedback transmission/reception resource information of the case where RLC AM is configured, and packet transmission/reception resource information of the case where RLC UM is configured, according to an embodiment.

V2X services supported by a base station may vary according to RAT type. For example, a basic safety service is supported by 4G RAT (4G Uu interface and 4G sidelink interface) and an advanced service may be supported by 5G RAT (5G Uu interface and 5G sidelink interface). A basic safety service identifier may be mapped to a 4G RAT profile and an advanced service identifier may be mapped to a 5G RAT profile.

A base station may transmit, through a service broadcast message (SIB), a RAT type, a basic safety service support indicator, an advanced service support indicator, an LTE indicator, a new radio (NR) indicator, V2X RAT version information, a RAT bitmap supported by the base station, and the like, so as to notify of a service for which sidelink communication is supported by the base station. In another embodiment, a base station may transmit 4G V2X SIB (information for basic safety service) or 5G V2X SIB (information for advanced service). If a terminal is in the coverage of the base station, the terminal may obtain, through a service broadcast message (SIB) transmitted by the base station, a RAT type, a basic safety service support indicator, and an advanced service support indicator to identify which V2X service the corresponding base station provides. The terminal may receive 4G V2X SIB (information for basic safety service) or 5G V2X SIB (information for advanced service) transmitted by the base station, so as to identify which V2X service the corresponding base station provides. In another embodiment, the terminal may determine that an area corresponds to a basic safety service area or an advanced service area, by using service frequency band information of the base station. If the terminal is not located in the coverage of the base station, the terminal may determine sidelink RAT for each service by using pre-configured information. The pre-configured information may include basic safety service/advanced service mapping information corresponding to a service frequency band and RAT type information corresponding to a basic safety service or an advanced service.

If the terminal is in the coverage of the base station, the terminal may receive, from the base station, resource information and configuration information for transmitting a packet generated in an application layer of the terminal. Therefore, on the basis of a service type (basic safety service and advanced service) generated in the application layer of the terminal and V2X RAT type information supported by the base station from which the terminal receives service, the terminal may determine whether to request, from the base station, resource information and configuration information required for transmitting a generated service packet or use pre-configured information. If the base station supports both two V2X RAT types, the terminal may transmit service type information the terminal needs, to the base station so as to receive, from the base station, resource information and configuration information required for transmitting the service packet.

4G RAT or 4G V2X of the disclosure may be based on a LTE-V2X technology, and 5G RAT or 5G V2X may be based on a NR-V2X technology.

Figure 12A:
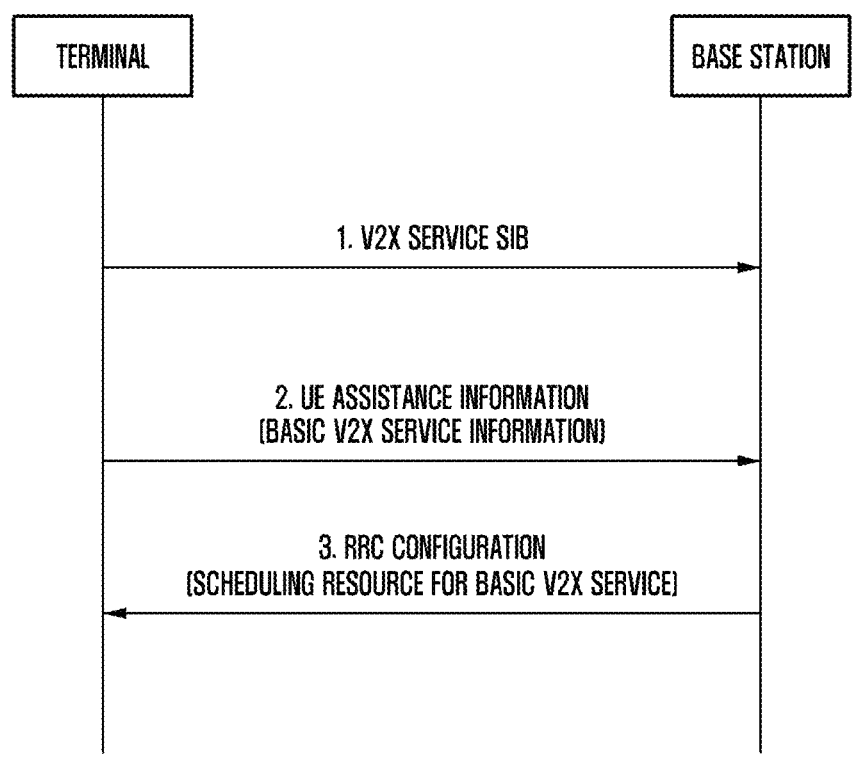
FIGS. 12A to 12B illustrate a signal flow diagram between a terminal and a base station which exchange RAT information according to a V2X service type according to various embodiments.
Figure 12B:
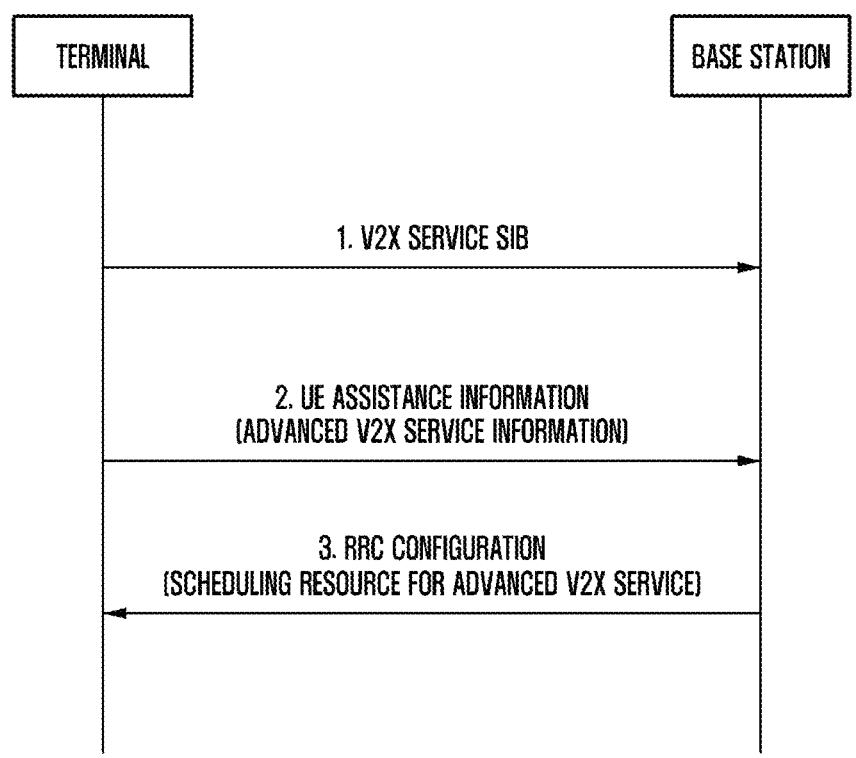

FIGS. 12A and 12B illustrate a signal flow diagram between a terminal and a base station which exchange RAT information according to a V2X service type according to various embodiments. Referring to (12-1) in FIG. 12, (1) a base station supporting a V2X service may transmit a V2X service broadcast message (SIB). According to an embodiment, the V2X SIB message may include at least one of whether a basic safety V2X service is supported by the base station, whether an advanced service is supported thereby, RAT type information, an LTE indicator, an NR indicator, version information for each RAT, and a RAT bitmap supported by the base station. In another embodiment, whether a basic V2X service is supported may be informed by transmitting an LTE-V2X SIB. Whether an advanced V2X service is supported may be informed by transmitting an NR-V2X SIB. (2) If a basic V2X safety service is generated, the terminal may determine whether the base station supports the basic V2X safety service, on the basis of information transmitted by the V2X SIB. If it is determined that the base station supports the basic V2X safety service, the terminal may transmit a UE assistance information message including information (destination identifier, service identifier, QoS information, etc.) relating to the basic V2X safety service. (3) The base station may receive the UE assistance information message and then transmit, to the terminal, an RRC configuration message including configuration information (packet transmission/reception resource information, scheduling information, LTE V2X mode 3 configuration and resource information, LTE V2X mode 4 configuration and resource information, etc.) required for using the basic V2X safety service.

Referring to (12-2) in FIG. 12, (1) a base station supporting a V2X service may transmit a V2X service broadcast message (SIB). According to an embodiment, the V2X SIB message may include at least one of whether a basic V2X safety service is supported by the base station, whether an advanced service is supported thereby, RAT type information, an LTE indicator, an NR indicator, version information for each RAT, and a RAT bitmap supported by the base station. In another embodiment, whether a basic V2X service is supported may be informed by transmitting an LTE-V2X SIB. Whether an advanced V2X service is supported may be informed by transmitting an NR-V2X SIB. (2) If an advanced V2X service is generated, the terminal may determine whether the base station supports the advanced V2X service, on the basis of information transmitted by the V2X SIB. If it is determined that the base station supports the advanced V2X service, the terminal may transmit a UE assistance information message including information (destination identifier, service identifier, QoS information, etc.) relating to the advanced V2X service. (3) The base station may receive the UE assistance information message and then transmit, to the terminal, an RRC configuration message including configuration information (packet transmission/reception resource information, scheduling information, NR V2X mode 1 resource and configuration information, NR V2X mode 2 resource and configuration information, etc.) required for using the advanced V2X service.

If the terminal fails to receive a V2X service SIB from the base station, the terminal may request, from the base station, V2X RAT configuration information required for V2X packet transmission or reception. In an embodiment, the terminal may randomly transmit, to the base station, UE assistance information including V2X service type information (a basic V2X service ID, an advanced V2X service ID, a basic V2X service indicator, an advanced V2X service indicator, and an QoS indicator). In another embodiment, the terminal may determine whether to transmit a UE assistance information message to the base station and V2X service type information (a basic V2X service ID, an advanced V2X service ID, a basic V2X service indicator, an advanced V2X service indicator, and an QoS indicator) to be included in the UE assistance information message, on the basis of information such assistance a service frequency of the base station, and a cell (an LTE cell or an NR cell) in which the base station is installed. If the terminal decides not to transmit a UE assistance information message, that is, if it is determined that the serving base station of the terminal provides a RAT which does not support a V2X service type desired by the terminal, the terminal may use pre-configured resource information for basic V2X services or pre-configured resource information for advanced V2X services, according to V2X service type information.

If the terminal has received a V2X service SIB from the base station, but the terminal determines that V2X RAT configuration information required for V2X packet transmission or reception is not included in the V2X service SIB, the terminal may request, from the base station, the V2X RAT configuration information required for V2X packet transmission or reception. An operation of requesting V2X RAT configuration information by the terminal may include at least one of the embodiments illustrated in FIGS. 12A and 12B.

Figure 13:
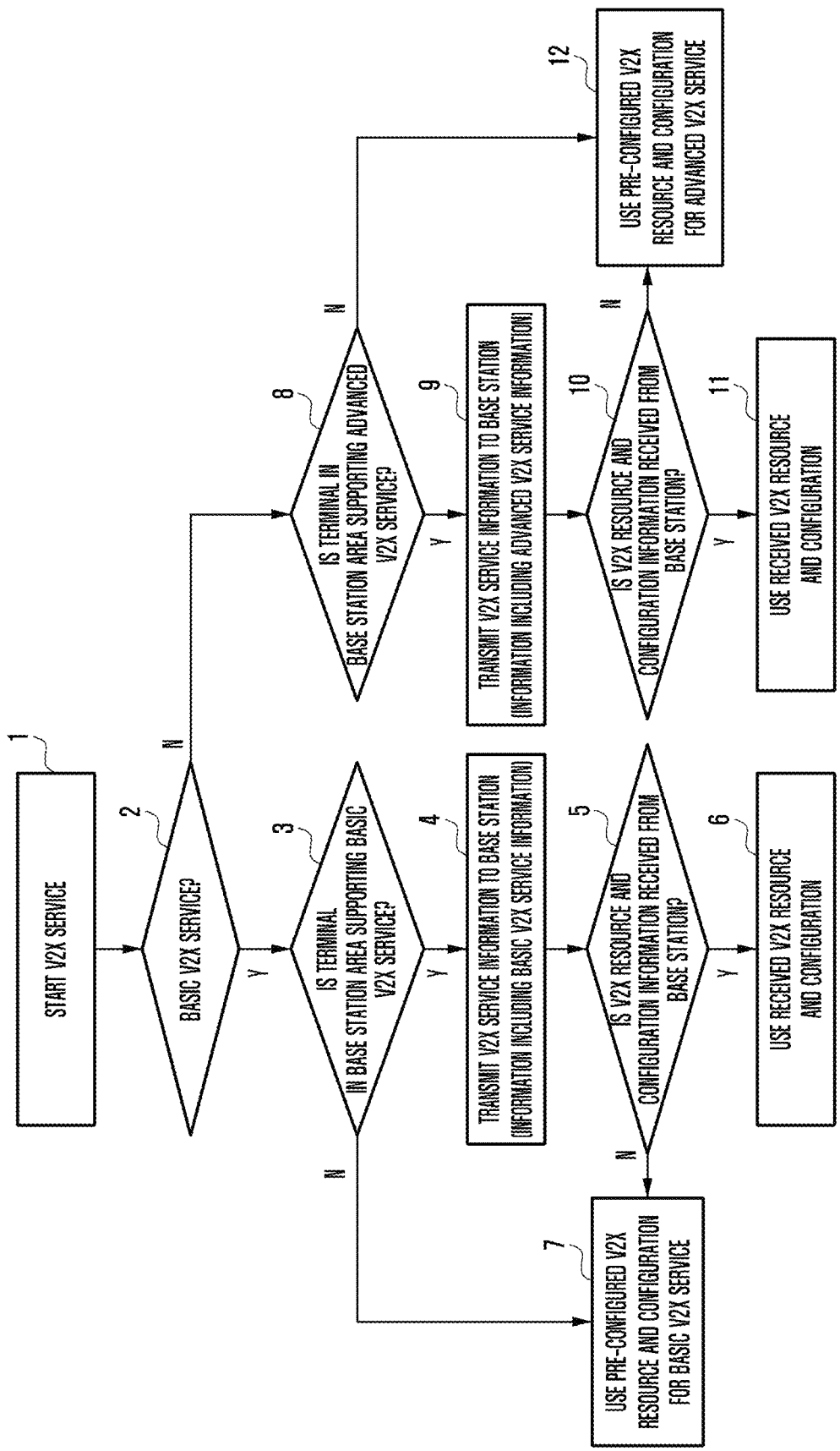
FIG. 13 illustrates an operation of obtaining V2X configuration information, based on RAT information according to a V2X service type by a terminal which is in an RRC-connected state, according to various embodiments.

FIG. 13 illustrates an operation of obtaining V2X configuration information, based on RAT information according to a V2X service type by a terminal which is in an RRC-connected state, according to various embodiments. In an RRC-connected state, the terminal may generally obtain V2X configuration information according to a V2X service type by exchanging an RRC dedicated message between the terminal and a base station. Referring to FIG. 13, (1) if a V2X service is started in an application layer of the terminal, (2) the terminal may determine whether the V2X service is a basic V2X service. If the terminal determines that the V2X service is the basic V2X service, according to a result of the operation indicated by the number (2), the terminal may identify whether the terminal is in a base station area supporting the basic V2X service, in an operation indicated by the number (3).

A method for determining the base station area supporting the basic V2X service in the operation indicated by the number (3) may correspond to at least one among the following methods.
  i. The case where the base station is determined to an LTE base station (a base station installed in an LTE service frequency and a base station installed in an LTE cell)
  ii. The case where the base station broadcasts information indicating that the base station supports the basic V2X service (a basic V2X service indicator, basic V2X service frequency information, a basic V2X service resource pool, a basic V2X service SIB, an LTE V2X SIB, etc.)

If the terminal is in the base station area supporting the basic V2X service according to a result of the operation indicated by the number (3), (4) the terminal may transmit a UE assistance information message to the base station to request resource and configuration information required for the basic V2X service. The UE assistance information message may include at least one of a basic V2X service identifier, a destination identifier, and QoS information. (5) The terminal may receive an RRC configuration message from the base station in response to the UE assistance information message, and may identify whether the resource and configuration information for the basic V2X service is received. If the terminal receives the resource and configuration information for the basic V2X service from the base station in the operation indicated by the number (5), (6) the terminal may use the basic V2X service by using the obtained information.

If the terminal is not located in the base station area supporting the basic V2X service according to a determination of the operation indicated by the number (3), (7) the terminal may obtain the resource and configuration information required for the basic V2X service from pre-configured configuration information. If the terminal fails to receive the resource and configuration information for the basic V2X service from the base station according to a determination of the operation indicated by the number (5), the terminal may perform an operation indicated by the number (7). An embodiment of a method for determining that the base station does not provide the resource and configuration information for the basic V2X service in the operation indicated by the number (5) may include at least one of the following contents.
  i. The base station transmits an RRC message including pre-configured basic V2X service resource and configuration information (pre-configured information use indicator and pre-configured resource information).
  ii. The terminal fails to receive an RRC configuration message including basic V2X service resource and configuration information from the base station within a predetermined time interval after the operation indicated by the number (4).

iii. The base station transmits an RRC message including indication information indicating that the base station is unable to provide resource and configuration information for the basic V2X service.

According to a result in the operation indicated by the number (2), if the terminal determines that the V2X service is an advanced V2X service, the terminal may identify that the terminal is located in a base station area supporting the advanced V2X service, in an operation indicated by the number (8).

A method for determining the base station area supporting the advanced V2X service in the operation indicated by the number (8) may correspond to at least one among the following methods.

i. The case where the base station is determined to an NR base station (a base station installed in an NR service frequency and a base station installed in an NR cell)

ii. The case where the base station broadcasts information (an advanced V2X service indicator, advanced V2X service frequency information, an advanced V2X service resource pool, an advanced V2X service SIB, an NR V2X SIB, etc.) indicating that the base station supports the advanced V2X service If the terminal is in the base station area supporting the advanced V2X service according to a result of the operation indicated by the number (8), (9) the terminal may transmit a UE assistance information message to the base station to request resource and configuration information required for the advanced V2X service. The UE assistance information message may include at least one of an advanced V2X service identifier, a destination identifier, and QoS information. (10) The terminal may receive an RRC configuration message from the base station in response to the UE assistance information message, and may identify whether the resource and configuration information for the advanced V2X service is received. If the terminal receives the resource and configuration information for the advanced V2X service from the base station in the operation indicated by the number (10), (11) the terminal may use the advanced V2X service by using the obtained information.

If the terminal is not located in the base station area supporting the advanced V2X service according to a determination of the operation indicated by the number (8), (12) the terminal may obtain the resource and configuration information required for the advanced V2X service from pre-configured configuration information. If the terminal fails to receive the resource and configuration information for the advanced V2X service from the base station according to a determination of the operation indicated by the number (10), the terminal may perform an operation indicated by the number (12). An embodiment of a method for determining that the base station does not provide the resource and configuration information for the advanced V2X service in the operation indicated by the number (10) may include at least one of the following contents.

i. The base station transmits an RRC message including pre-configured advanced V2X service resource and configuration information (pre-configured information use indicator and pre-configured resource information).

ii. The terminal fails to receive an RRC configuration message including advanced V2X service resource and configuration information from the base station within a predetermined time interval after the operation indicated by the number (9).

iii. The base station transmits an RRC message including indication information indicating that the base station is unable to provide resource and configuration information for the advanced V2X service.

Figure 14:
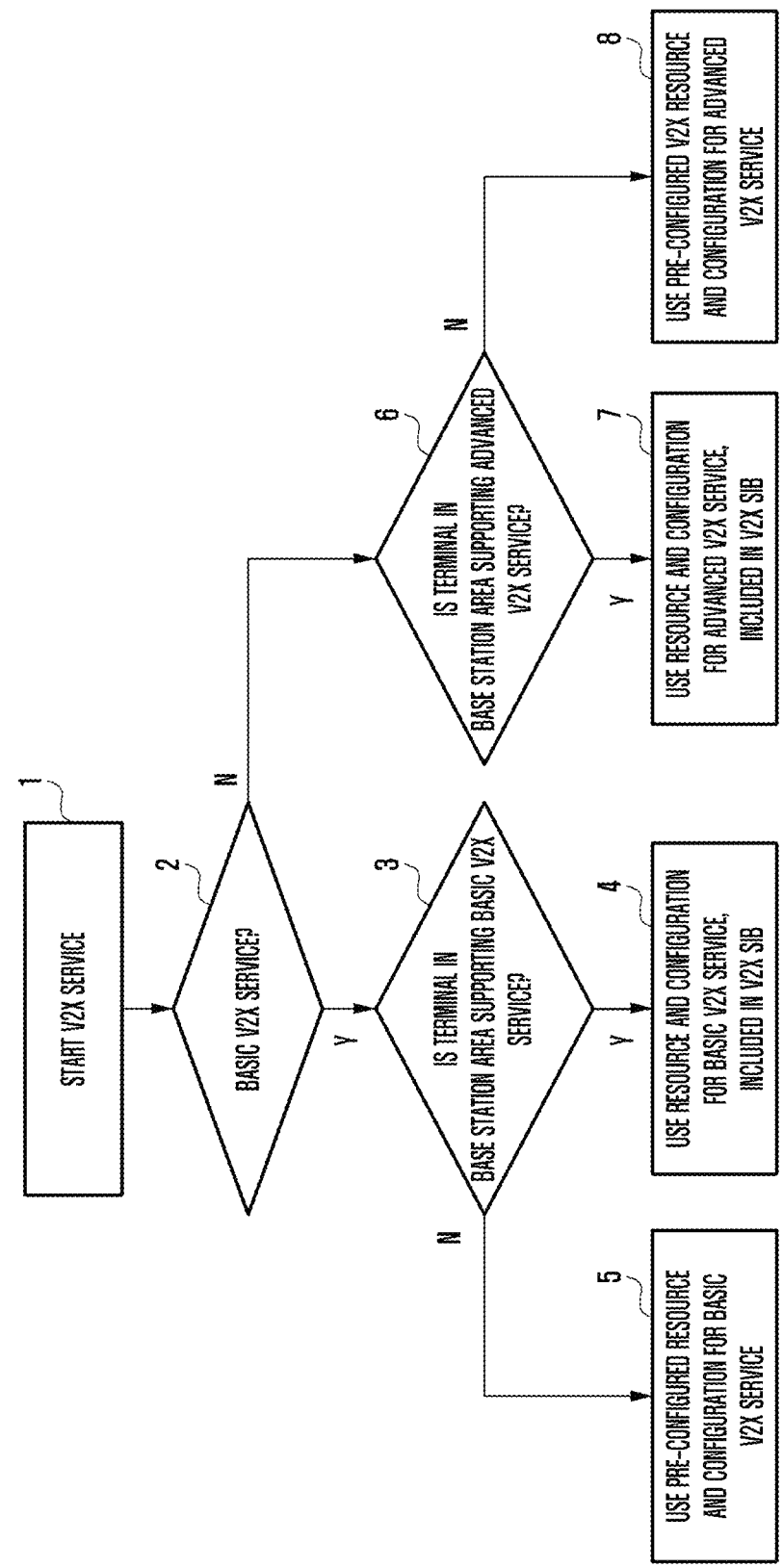
FIG. 14 illustrates an operation of obtaining V2X configuration information, based on RAT information according to a V2X service type by a terminal which is in an RRC-disconnected state, according to various embodiments.

FIG. 14 illustrates an operation of obtaining V2X configuration information, based on RAT information according to a V2X service type by a terminal which is in an RRC-disconnected state, according to various embodiments. In an RRC-disconnected state, the terminal may generally obtain V2X configuration information according to a V2X service type by receiving a V2X SIB message transmitted by a base station through broadcast. Referring to FIG. 14, (1) if a V2X service is started in an application layer of the terminal, (2) the terminal may determine whether the V2X service is a basic V2X service. If the terminal determines that the V2X service is the basic V2X service, according to a result of the operation indicated by the number (2), the terminal may identify whether the terminal is in a base station area supporting the basic V2X service, in an operation indicated by the number (3).

A method for determining the base station area supporting the basic V2X service in the operation indicated by the number (3) may correspond to at least one among the following methods.

i. The case where the base station is determined to an LTE base station (a base station installed in an LTE service frequency and a base station installed in an LTE cell)

ii. The case where the base station broadcasts information indicating that the base station supports the basic V2X service (a basic V2X service indicator, basic V2X service frequency information, a basic V2X service resource pool, a basic V2X service SIB, an LTE V2X SIB, etc.)

If the terminal is in the base station area supporting the basic V2X service according to a result of the operation indicated by the number (3), (4) the terminal may use basic V2X service resource and configuration information included in the V2X SIB message transmitted by the base station. If the terminal is not located in the base station area supporting the basic V2X service according to a determination in the operation indicated by the number (3), (5) the terminal may obtain resource and configuration information required for the basic V2X service from pre-configured configuration information.

A case where resource and configuration information for the basic V2X service is not included in the V2X SIB message transmitted by the base station in the operation indicated by the number (4) is also possible. In this case, the terminal may perform the operation indicated by the number (5). An embodiment allowing a determination that the resource and configuration information for the basic V2X service is not included in the V2X SIB message may include at least one of the following contents.

i. The base station transfers a V2X SIB message including pre-configured basic V2X service resource and configuration information (pre-configured information use indicator and pre-configured resource information).

ii. The base station does not transmit an SIB message including the basic V2X service resource and configuration information.

According to a result in the operation indicated by the number (2), if the terminal determines that the V2X service is an advanced V2X service, the terminal may identify that the terminal is located in a base station area supporting the advanced V2X service, in an operation indicated by the number (6).

A method for determining the base station area supporting the advanced V2X service in the operation indicated by the number (6) may correspond to at least one among the following methods.

i. The case where the base station is determined to an NR base station (a base station installed in an NR service frequency and a base station installed in an NR cell)

ii. The case where the base station broadcasts information (an advanced V2X service indicator, advanced V2X service frequency information, an advanced V2X service resource pool, an advanced V2X service SIB, an NR V2X SIB, etc.) indicating that the base station supports the advanced V2X service If the terminal is in the base station area supporting the advanced V2X service according to a result of the operation indicated by the number (6), (7) the terminal may use advanced V2X service resource and configuration information included in the V2X SIB message transmitted by the base station. If the terminal is not located in the base station area supporting the advanced V2X service according to a determination in the operation indicated by the number (6), (8) the terminal may obtain resource and configuration information required for the advanced V2X service from pre-configured configuration information.

A case where resource and configuration information for the advanced V2X service is not included in the V2X SIB message transmitted by the base station in the operation indicated by the number (7) is also possible. In this case, the terminal may perform the operation indicated by the number (8).

An embodiment of a method for determining that the base station does not provide the resource and configuration information for the advanced V2X service in the operation indicated by the number (7) may include at least one of the following contents.

(1) The base station transfers an SIB message including pre-configured advanced V2X service resource and configuration information (pre-configured information use indicator and pre-configured resource information).

(2) The base station does not transmit an SIB message including the advanced V2X service resource and configuration information.

Next, referring to FIG. 15, a method for exchanging information indicating bi-directional sidelink traffic during a procedure of configuring a connection for sidelink unicast between a terminal 120 and a terminal 130, and according thereto, obtaining configuration information for sidelink unicast-based transmission or reception of a packet will be explained. If two terminals transmit or receive bi-directional sidelink traffic to or from each other, transmission-specific configuration information, configuration information required to be exchanged between a transmission terminal and a reception terminal, and reception-specific configuration information may be identically configured in a case where the terminals 120 and 130 serve as transmission terminals and in a case where the terminals 120 and 130 serve as reception terminals. In these cases, one terminal among the terminals 120 and 130 may obtain SLRB connection configuration information corresponding to the bi-directional sidelink traffic and may share the obtained SLRB connection configuration information with the opposite terminal.

Figure 15:
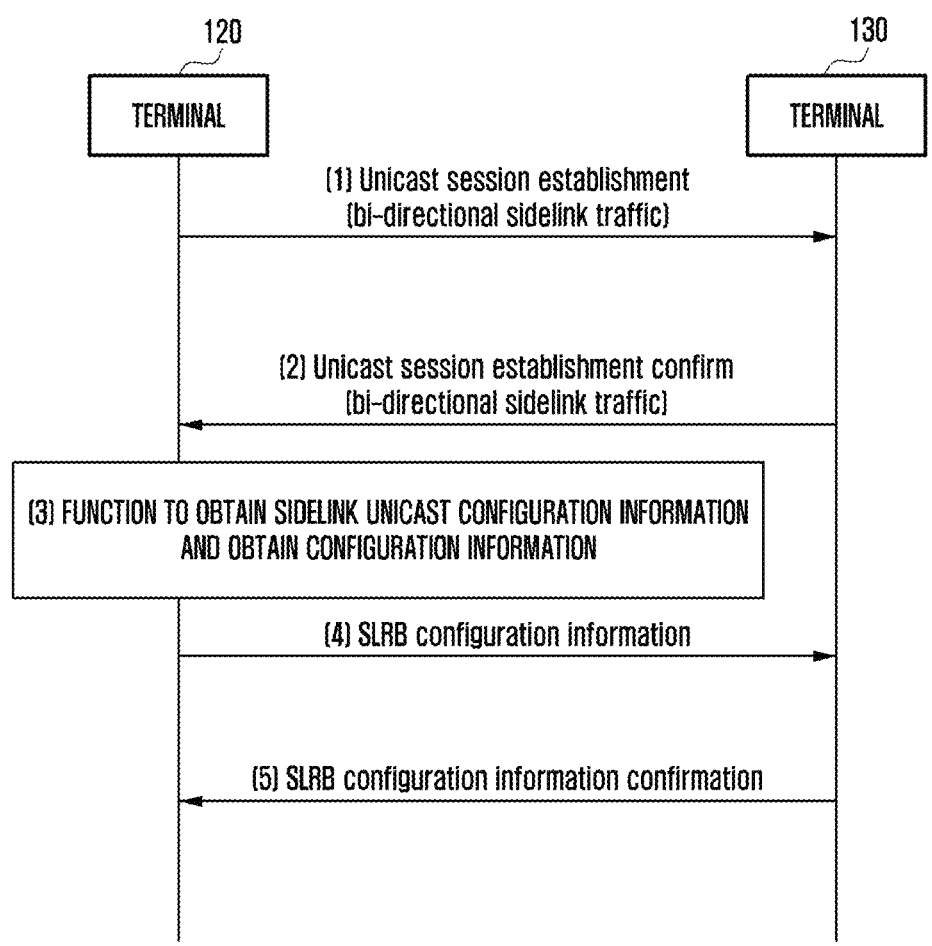
FIG. 15 illustrates an operation of processing sidelink unicast configuration information by a terminal according to an embodiment.

FIG. 15 illustrates an operation of processing sidelink unicast configuration information by a terminal according to an embodiment.

Referring to FIG. 15, the terminal 120 may transmit a connection configuration message for sidelink unicast, in an operation indicated by the number (1). The message transmitted in the operation indicated by the number (1) may include at least one of a PC5-S message or a PC5-RRC message. The message transmitted in the operation indicated by the number (1) may include information indicating a sidelink unicast connection configuration for transmission or reception of bi-directional sidelink traffic. The terminal 130 may transmit a response message of the connection configuration message for sidelink unicast which is transmitted by the terminal 120, in the operation indicated by the number (2). The message transmitted in the operation indicated by the number (2) may include at least one of a PC5-S message or a PC5-RRC message. The message transmitted in the operation indicated by the number (2) may include information indicating a sidelink unicast connection configuration for transmission or reception of bi-directional sidelink traffic. The terminal 120 may be configured to function to obtain configuration information of a sidelink unicast connection for transmission or reception of the bi-directional sidelink traffic, in the operation indicated by the number (3). The embodiment illustrated in FIG. 15 illustrates a case where the terminal 120 obtains connection configuration information for transmission or reception of bi-directional sidelink traffic, but the terminals may exchange information indicating a terminal functioning to obtain connection configuration information for transmission or reception of bi-directional sidelink traffic, in the procedure indicated by the number (1) or (2), and the terminal which will function to obtain the connection configuration information may be determined according to the exchanged information. The terminal functioning to obtain connection configuration information for transmission or reception of bi-directional sidelink traffic may obtain at least one of sidelink unicast transmission/reception resource information, configuration information for transmission according to an RLC transmission mode, configuration information required to be shared by a transmission terminal and a reception terminal according to the RLC transmission mode, and configuration information for reception according to the RLC transmission mode according to the methods illustrated in FIGS. 5 to 11. For example, if the terminal 120 is determined to be in the coverage of a base station, the terminal 120 may obtain the configuration information from the base station. If the terminal 120 is located outside a base station coverage, the terminal 120 may obtain pre-configured configuration information. For example, a part of the configuration information may be randomly configured by the terminal 120. The terminal 120 may transfer the obtained sidelink unicast configuration information to the terminal 130, in the operation indicated by the number (4). The terminal 130 may obtain the sidelink unicast configuration information from the terminal 120 and then transfer an identification message to the terminal 120 in response to the information, in an operation indicated by the number (5).

Although not illustrated in FIG. 15, whether the method of obtaining connection configuration information for transmission or reception of bi-directional sidelink traffic as illustrated in FIG. 15 is supported may be indicated by a base station, or may be notified of the base station by a terminal and then indicated by the base station.

Methods according to embodiments stated in claims and/or disclosed herein may be implemented in hardware, software, or a combination of hardware and software.

When the methods are implemented by software, a computer-readable storage medium for storing at least one program (software module) may be provided. The at least one program stored in the computer-readable storage medium may be configured for execution by at least one processor within an electronic device. The at least one program may include instructions that cause the electronic device to perform the methods according to embodiments as defined by the appended claims and/or disclosed herein.

The at least one program (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the memories may form a memory in which the program is stored. Further, a plurality of such memories may be included in the electronic device.

In addition, the at least one program may be stored in an attachable storage device which is accessible through a communication network such as the Internet, Intranet, local area network (LAN), wide area network (WAN), and storage area network (SAN), or a combination thereof. Such a storage device may access a device performing embodiments via an external port. Further, a separate storage device on the communication network may access a device performing embodiments.

In the above-described detailed embodiments, an element included in the disclosure is expressed in the singular or the plural according to a detailed embodiment. However, the singular form or plural form is selected for convenience of description, suitable for the presented situation, and the disclosure is not limited to a single element or multiple elements thereof. Further, either multiple elements expressed in the description may be configured into a single element or a single element in the description may be configured into multiple elements.

While the detailed description in the disclosure has been shown with reference to certain embodiments thereof, it will be understood that various changes can be made therein without departing from the scope of the disclosure. Therefore, the scope of the disclosure should not be defined as being limited to the described embodiments, but should be defined by the appended claims and equivalents thereof.

What is claimed is:

1. A method performed by a first terminal, the method comprising:
    transmitting, to a base station, a first message including a destination identity, transmission type information, radio link control (RLC) mode information, and quality of service (QoS) information, wherein the transmission type information corresponds to unicast;
    receiving, from the base station, a second message including sidelink RLC configuration information associated with an RLC mode based on the first message; and
    transmitting, to a second terminal, a third message comprising the sidelink RLC configuration information based on the second message,
    wherein the sidelink RLC configuration information is configured by the second terminal based on the third message.

2. The method of claim 1, wherein the transmission type information further corresponds to at least one of groupcast or broadcast.

3. The method of claim 1,
    wherein the second message is a radio resource control (RRC) message in case that the first terminal is in a connected mode, or
    wherein the second message is a system information block (SIB) in case that the first terminal is in an idle mode or an inactive mode.

4. A method performed by a base station, the method comprising:
    receiving, from a first terminal, a first message including a destination identity, transmission type information, radio link control (RLC) mode information, and quality of service (QoS) information, wherein the transmission type information corresponds to unicast;
    determining an RLC mode, based on the first message; and
    transmitting, to the first terminal, a second message including sidelink RLC configuration information associated with the RLC mode,
    wherein the sidelink RLC configuration information is configured by a second terminal.

5. The method of claim 4, wherein the transmission type information further corresponds to at least one of groupcast or broadcast.

6. The method of claim 4,
    wherein the second message is a radio resource control (RRC) message in case that the first terminal is in a connected mode, or
    wherein the second message is a system information block (SIB) in case that the first terminal is in an idle mode or an inactive mode.

7. A method performed by a second terminal, the method comprising:
    receiving, from a first terminal, a third message comprising sidelink radio link control (RLC) configuration information based on a second message received from a base station; and
    configuring the sidelink RLC configuration information based on the third message,
    wherein the second message includes the sidelink RLC configuration information associated with an RLC mode determined based on a destination identity, transmission type information corresponding to unicast, RLC mode information, and quality of service (QoS) information.

8. The method of claim 7,
    wherein the second message is a radio resource control (RRC) message in case that the first terminal is in a connected mode, or
    wherein the second message is a system information block (SIB) in case that the first terminal is in an idle mode or an inactive mode.

9. A first terminal in a wireless communication system, the first terminal comprising:
    a transceiver unit; and
    a control unit connected to the transceiver unit, the control unit configured to:
        transmit, to a base station, a first message including a destination identity, transmission type information, radio link control (RLC) mode information, and quality of service (QoS) information, wherein the transmission type information corresponds to unicast,
        receive, from the base station, a second message including sidelink RLC configuration information associated with an RLC mode based on the first message, and
        transmit, to a second terminal, a third message comprising the sidelink RLC configuration information based on the second message, wherein the sidelink RLC configuration information is configured by the second terminal based on the third message.

10. The first terminal of claim 9, wherein the transmission type information further corresponds to at least one of groupcast or broadcast.

11. The first terminal of claim 9,
wherein the second message is a radio resource control (RRC) message in case that the first terminal is in a connected mode, or
wherein the second message is a system information block (SIB) in case that the first terminal is in an idle mode or an inactive mode.

12. A base station in a wireless communication system, the base station comprising:
a transceiver unit; and
a control unit connected to the transceiver unit, the control unit configured to:
receive, from a first terminal, a first message including a destination identity, transmission type information, radio link control (RLC) mode information, and quality of service (QoS) information, wherein the transmission type information corresponds to unicast,
determine an RLC mode, based on the first message, and
transmit, to the first terminal, a second message including sidelink RLC configuration information associated with the RLC mode,
wherein the sidelink RLC configuration information is configured by a second terminal.

13. The base station of claim 12, wherein the transmission type information further corresponds to at least one of groupcast or broadcast.

14. The base station of claim 12,
wherein the second message is a radio resource control (RRC) message in case that the first terminal is in a connected mode, or
wherein the second message is a system information block (SIB) in case that the first terminal is in an idle mode or an inactive mode.

15. A second terminal in a wireless communication system, the second terminal comprising:
a transceiver unit; and
a control unit connected to the transceiver unit, the control unit configured to:
receive, from a first terminal, a third message comprising sidelink radio link control (RLC) configuration information based on a second message received from a base station, and
configure the sidelink RLC configuration information based on the third message,
wherein the second message includes the sidelink RLC configuration information associated with an RLC mode determined based on a destination identity, transmission type information corresponding to unicast, RLC mode information, and
quality of service (QoS) information.

* * * * *